(12) United States Patent
Fields et al.

(10) Patent No.: US 12,067,408 B2
(45) Date of Patent: Aug. 20, 2024

(54) METHOD AND SYSTEM FOR RECOGNIZING USER INTENT AND UPDATING A GRAPHICAL USER INTERFACE

(71) Applicant: MYPLANET INTERNET SOLUTIONS LTD, Toronto (CA)

(72) Inventors: Gregory Jason Fields, Waterloo (CA); Yashar Rassoulli, Richmond Hill (CA); Aleksandar Stefanovic, Toronto (CA); Daniel Ma, Toronto (CA); Jason Cottrell, Toronto (CA)

(73) Assignee: MYPLANET INTERNET SOLUTIONS LTD., Toronto (CA)

(*) Notice: Subject to any disclaimer, the term of this patent is extended or adjusted under 35 U.S.C. 154(b) by 0 days.

(21) Appl. No.: 17/768,741

(22) PCT Filed: Dec. 21, 2020

(86) PCT No.: PCT/CA2020/051773
§ 371 (c)(1),
(2) Date: Apr. 13, 2022

(87) PCT Pub. No.: WO2021/127778
PCT Pub. Date: Jul. 1, 2021

(65) Prior Publication Data
US 2024/0143345 A1        May 2, 2024

Related U.S. Application Data

(60) Provisional application No. 62/952,645, filed on Dec. 23, 2019.

(51) Int. Cl.
G06F 3/00      (2006.01)
G06F 9/451     (2018.01)
G06F 11/34     (2006.01)
G06F 3/01      (2006.01)

(52) U.S. Cl.
CPC ......... *G06F 9/451* (2018.02); *G06F 11/3438* (2013.01)

(58) Field of Classification Search
None
See application file for complete search history.

(56) References Cited

U.S. PATENT DOCUMENTS

| | | | |
|---|---|---|---|
| 2011/0289531 A1* | 11/2011 | Moonka | G11B 27/28 725/38 |
| 2017/0063900 A1 | 3/2017 | Muddu et al. | |
| 2018/0136794 A1 | 5/2018 | Cassidy et al. | |
| 2018/0157981 A1* | 6/2018 | Albertson | G06Q 30/0282 |
| 2018/0211178 A1 | 7/2018 | Millius et al. | |
| 2019/0080019 A1 | 3/2019 | Young et al. | |

(Continued)

*Primary Examiner* — Toan H Vu
(74) *Attorney, Agent, or Firm* — Tarolli, Sundheim, Covell & Tummino LLP

(57) ABSTRACT

The present method and system provides for recognizing user intent and updating a graphical user interface. In an example, the method and system comprise collecting usage data from users, grouping users based on usage data, assigning a user intent to each group of users, training an intent prediction model using machine learning, providing access to the intent prediction model, assigning an intent to a new user using the intent prediction model, and, modifying the graphical user interface to facilitate the assigned intent of the user.

16 Claims, 21 Drawing Sheets

(56) References Cited

U.S. PATENT DOCUMENTS

| | | |
|---|---|---|
| 2020/0118028 A1* | 4/2020 | Harris ................. H04L 63/1416 |
| 2020/0133643 A1 | 4/2020 | Hou |
| 2020/0133644 A1 | 4/2020 | Hou |
| 2020/0133693 A1 | 4/2020 | Rohde et al. |
| 2020/0134388 A1 | 4/2020 | Rohde |
| 2020/0226794 A1* | 7/2020 | Sugio ...................... G01S 17/06 |
| 2022/0279220 A1* | 9/2022 | Khavronin ......... G06Q 30/0201 |
| 2022/0344014 A1* | 10/2022 | Kim ....................... G06Q 50/26 |

* cited by examiner

| userID | sessionID | Device Type | Referring Site | ... |
|---|---|---|---|---|
| abc | 123 | Mobile | Facebook.com | ... |
| efg | 456 | Desktop | Google.com | ... |
| ... | ... | ... | .... | ... | user journey across time where each ◇ represents a point in time where session data is sent to the hosted ML model

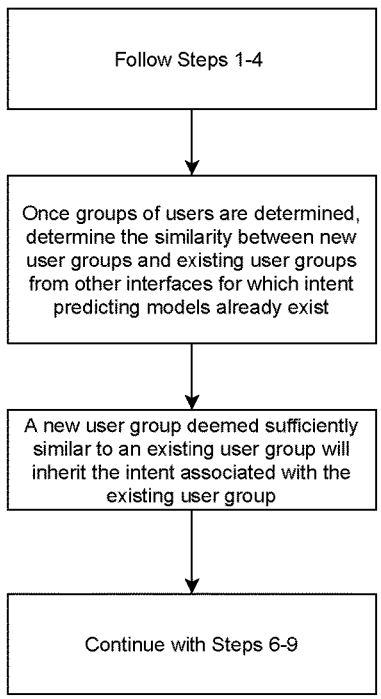
FIG. 23
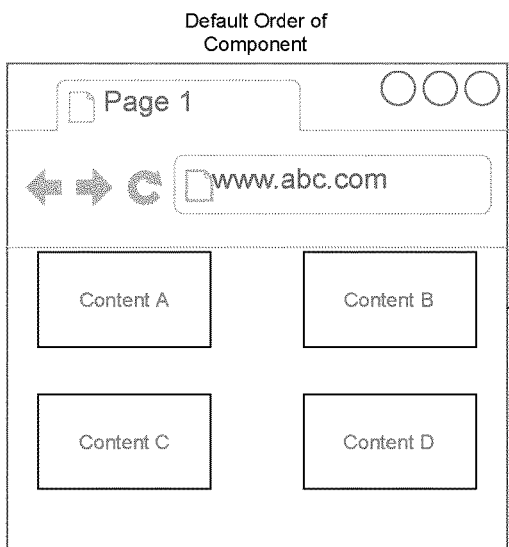
FIG. 22
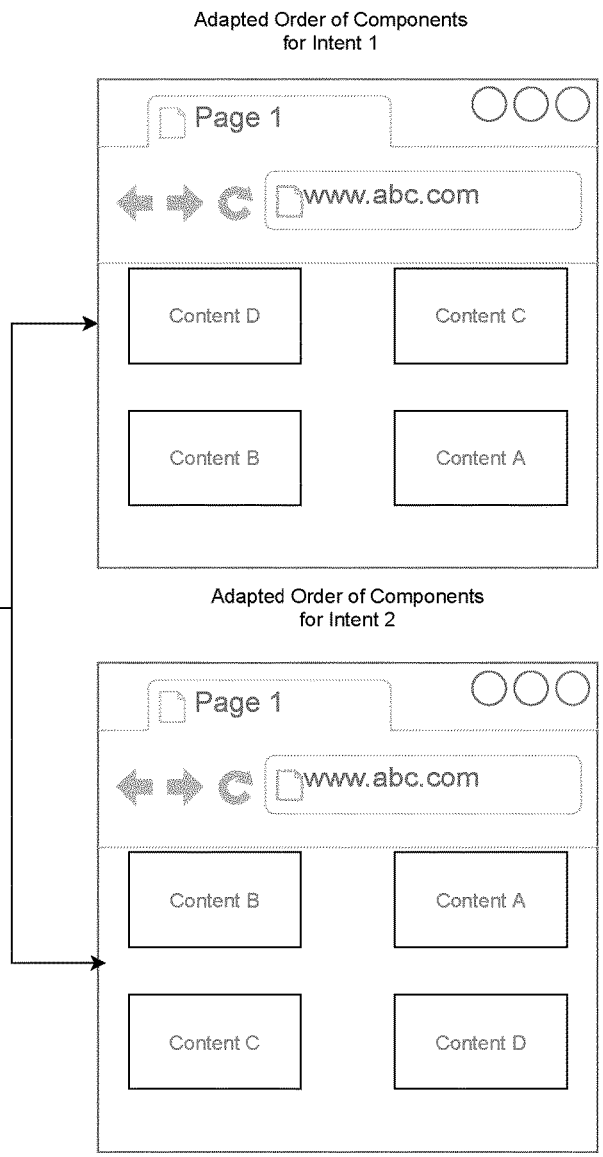

METHOD AND SYSTEM FOR RECOGNIZING USER INTENT AND UPDATING A GRAPHICAL USER INTERFACE

CROSS REFERENCES TO RELATED APPLICATIONS

This application filed under 35 U.S.C § 371 is a national phase application of International Application Serial Number PCT/CA2020/051773 filed Dec. 21, 2020, which claims priority to U.S. Provisional Application Ser. No. 62/952,645 filed Dec. 23, 2019.

BACKGROUND

Graphical User Interfaces (GUI) such as web pages can be configured to change based on the context in which the device or web page is being used or viewed.

Dynamically updating a Graphical User Interface based on a usage data provided from the device/Graphical User Interface typically relies on sensor data to provide simple layout-based updates to a graphical user interface.

For example, front-end development packages such as REACT or BOOTSTRAP are configured to allow for GUI layout changes to a webpage/graphical user interface based on device-detected criteria such as the size and/or the orientation of the screen.

Other GUI packages may allow for other context-related GUI changes. For instance, in some examples a web browser can provide information to the GUI client or application that the device's audio output is silenced or muted. In these examples the GUI may pop-up a warning that the device's audio output is muted and remind the user to turn up the device's volume.

Also, As the number of users for a given single graphical user interface (GUI) grows, the friction between the experience that the GUI delivers and the one that is perceived to be required by different users also grows.

A single GUI may serve the functional needs of many different users in a variety of contexts. For example, an apparel ecommerce website allows users to interact with its GUI to make purchases directly online. However, not every single user interacting with the GUI is intending to make a purchase at any given time. Though users understand that the functionality of placing an order or making a purchase for merchandise is possible, users also demonstrate smaller, specific needs and intents—at any given moment—that are within the broader goal of making a purchase. For example, an user may decide to interact with the GUI to better understand new merchandise offered by the website with no desire to make a purchase during the interaction.

SUMMARY

An object of the disclosed methods and systems is to adapt to specific intents and contexts for different users, enabling a better user experience. For online commercial applications such as ecommerce or marketing, this helps improve conversion and increases revenue in those applications.

In an aspect there is provided a method comprising, collecting usage data from a computing device and a graphical user interface, the usage data generated by users of the computing device and the graphical user interface; grouping, by using a grouping machine learning model, each of the users into similar user groups based on a data representation, the data representation representing the usage data of the users and the similar user groups; assigning, by using the assigning model and the data representation, a user intent to each of the similar user groups, the data representation further representing the user intent of each of the similar user groups; training an intent prediction model using a predictive machine learning model for predicting the user intent of an unclassified user based on unclassified user usage data, the training performed on the usage data; providing access to the intent prediction model; assigning an assigned user intent to the unclassified user using the intent prediction model and unclassified user usage data, the unclassified user usage data from an unclassified user computing device and the graphical user interface, and the unclassified user is now a classified user; modifying the graphical user interface in response to the assigned user intent in order to facilitate the assigned user intent of the classified user.

In another aspect, a method is provided comprising, collecting usage data from a computing device and a graphical user interface, the usage data generated by users of the computing device and the graphical user interface; grouping, by using a grouping machine learning model, each of the users into similar user groups based on a data representation, the data representation representing the usage data of the users and the similar user groups; determining a similarity score between the similar user groups and existing user groups, the existing user groups previously grouped and assigned an existing user intent using the grouping machine learning model based on a past data representation, the past data representation representing past usage data generated by existing users of a past computing device and a past graphical user interface; if the similarity score exceeds a threshold, then, assigning to the similar user group a user intent that is the existing user intent, the data representation further representing the user intent of each of the similar user groups; training an intent prediction model using a predictive machine learning model for predicting the user intent of an unclassified user based on unclassified user usage data, the training performed on the usage data; providing access to the intent prediction model; assigning an assigned user intent to the unclassified user using the intent prediction model and unclassified user usage data, the unclassified user usage data from an unclassified user computing device and the graphical user interface, and the unclassified user is now a classified user; modifying the graphical user interface in response to the assigned user intent in order to facilitate the assigned user intent of the classified user.

In an embodiment, the method further comprises, if the similarity score does not exceed the threshold, then, assigning, by using the assigning machine learning model and the data representation, a user intent to each of the similar user groups, the data representation further representing the intent of each of the similar user groups. In another embodiment, the method determines a similarity between the similar user groups and existing user groups, further comprises: processing the data representation with a standardizer function; processing the past data representation with the standardizer function; and wherein, the standardizer function allows for the comparison of the data representation with the past data representation. In another embodiment, the method determines a similarity between the similar user groups and existing user groups, further comprises: comparing each similar user group with each existing user group; determining a similarity score for each comparison; selecting the comparison of each of the similar user group with each existing user group with the highest similarity score; wherein, the highest similarity score represents the most similar groups. In another embodiment of the method, the past graphical user interface is the same as the graphical user interface or different then the graphical user interface. In another embodiment, the method periodically, processes new usage data of the classified user with the intent prediction model for determining a new user intent; assigning the new user intent to the classified user. In another embodiment of the method, the machine learning model is a series of machine learning models. In another embodiment, the method modifies the graphical user interface by changing a control component, a content component, or both. In another embodiment of the method, the control components are any one of a button, a slider, a menu bar, or an order of items in a control component. In another embodiment of the method, the content components are any one of a graphic, a text box, a list, a notification, an image, a label, a layout change, or, an order of items in a content component. In another embodiment of the method, the user data is any one of: a referring source site, a device type, a session identifier, a user identifier, a user operating system, a browser operating system, a length of time spent during a session, a time of the session, a date of the session, a number of pages viewed, a specific page path, a new user, a returning user, and a purchase made. In another embodiment of the method, the graphical user interface is for a website, a computer application, or a mobile computer application. In another embodiment of the method, the user intent is from a list of predetermined user intents. In another embodiment of the method, the intent prediction model is running on a remote server or accessible by a computer network. In another embodiment, the method selects a prefabricated user interface component for the identified user intention without the user selecting the identified user intention. In another embodiment, the method selects a preferred prefabricated user interface component corresponding to the identified user intention Another aspect is to provide a system comprising, a memory; a processor, operatively connected to the memory, the processor configured to perform any of the disclosed methods.

In an aspect, to reduce the friction of the actual experience and the perceived experience required from users, a GUI can adapt to the different needs of users. A GUI consists of lower-level 'components' which includes both control and content components. Control components are portions of the GUI that are always expected to perform a certain action and response when users interact with them. Content components, while may sometimes receive input from users in the same way as control components, mainly serve visual purposes.

Control components are by default designed to be static and do not change from one user's experience to another. For example, a web-browser's 'back' button when triggered, will always take the user to the previous screen or page. Due to the rigidity of these control components, users are often needing to perform multiple actions with a single component in order to achieve the desired outcome. For example, an user hitting the 'back' button several times to arrive at the homepage of the website.

To reduce the number of required actions and make navigating a GUI less cumbersome, control components can be modified to take on different variations that best serve a given user's intention at a given moment. Relating to the previous example of an user's intention to navigate to the homepage, the 'back' button may be adapted that when interacted with, will take the user to the homepage instead of the default functionality, which is to take the user to the previous screen.

In another example, an user's intention can be much less explicit, in that the user doesn't know what the specific series of actions that are required to reach the desired outcome, but expresses high-level emotions relating to the experience of interacting with the GUI. For example, users express they are 'frustrated' with the GUI. In this scenario, one or a series of control components can be modified to best serve users in this current state.

In order to provide the most relevant modifications to a control component, signals in the form of behavioral data are used to assess and determine an user's intent at any given moment in time.

In another aspect, these GUI updates respond only to the present or past state of the device on which the GUI is being displayed. That is, these previously described "mechanisms" for updating the GUI are not able to update the GUI based on the anticipated needs of the user.

The ability to predictively update a GUI based on the anticipated needs of the user would improve the user's experience. This would likely lead to several positive benefits such as increased user satisfaction, increased user engagement, reducing user frustration, etc.

What is provided is a method and system for predictively updating a GUI based on data collected from the user as the user uses the GUI. The collected data is transformed to a format that allows for processing by a machine learning system. The machine learning system then processes the data to identify a user intention based on the collected data.

In a world with a proliferation of user interfaces, digital experiences and convergence of physical and virtual touchpoints the ability for software application development teams and their organizations to adapt to their users desires, intentions and actions becomes increasingly complex.

What is provided is a set of reusable smart components that can be used as part of the application development process to adapt both their content and presentation based on the context in which they are used and interacted with an input of an increasing set of data attributes, including but not limited to; user device information such as geo-location, device orientation, cursor position and speed, type of device, device resolution, placement of other smart components, industry and customer specific parameters, content of the smart component, time of data, time of year, and other notable events.

Using machine learning and business rules, these components would learn what the best possible content and presentation mutation is based on the variety of environmental and situational inputs their exposed to and past learnings of outcomes.

In an aspect, a method is provided, the method comprising: collecting usage data from a computing device and a graphical user interface, the usage data generated by a user of the computing device and the graphical user interface; transforming the collected usage data for use in a machine learning system; identifying a user intention associated with the transformed usage data by processing the transformed usage data using the machine learning system; and selecting a prefabricated user interface component corresponding to the identified user intention without the user selecting the identified user intention.

In an aspect, a system is provided, the system comprising: a memory; a processor, operatively connected to the memory, the processor configured to: collect usage data from a computing device and a graphical user interface, the usage data generated by a user of the computing device and the graphical user interface; transform the collected usage data for use in a machine learning system; identify a user intention associated with the transformed usage data by processing the transformed usage data using the machine learning system; and select a prefabricated user interface component corresponding to the identified user intention without the user selecting the identified user intention.

BRIEF DESCRIPTION OF THE FIGURES

The following figures describe non-limiting embodiments of the disclosed methods, systems, and computer readable medium.

FIG. 22 is a representative drawing depicting an embodiment of the ML model providing a variant of a content component in response to an intent.

FIG. 23 is a flowchart showing an embodiment of the present disclosure.

FIGURE NUMBERS AS USED IN THE FIGURES

Figure 1:
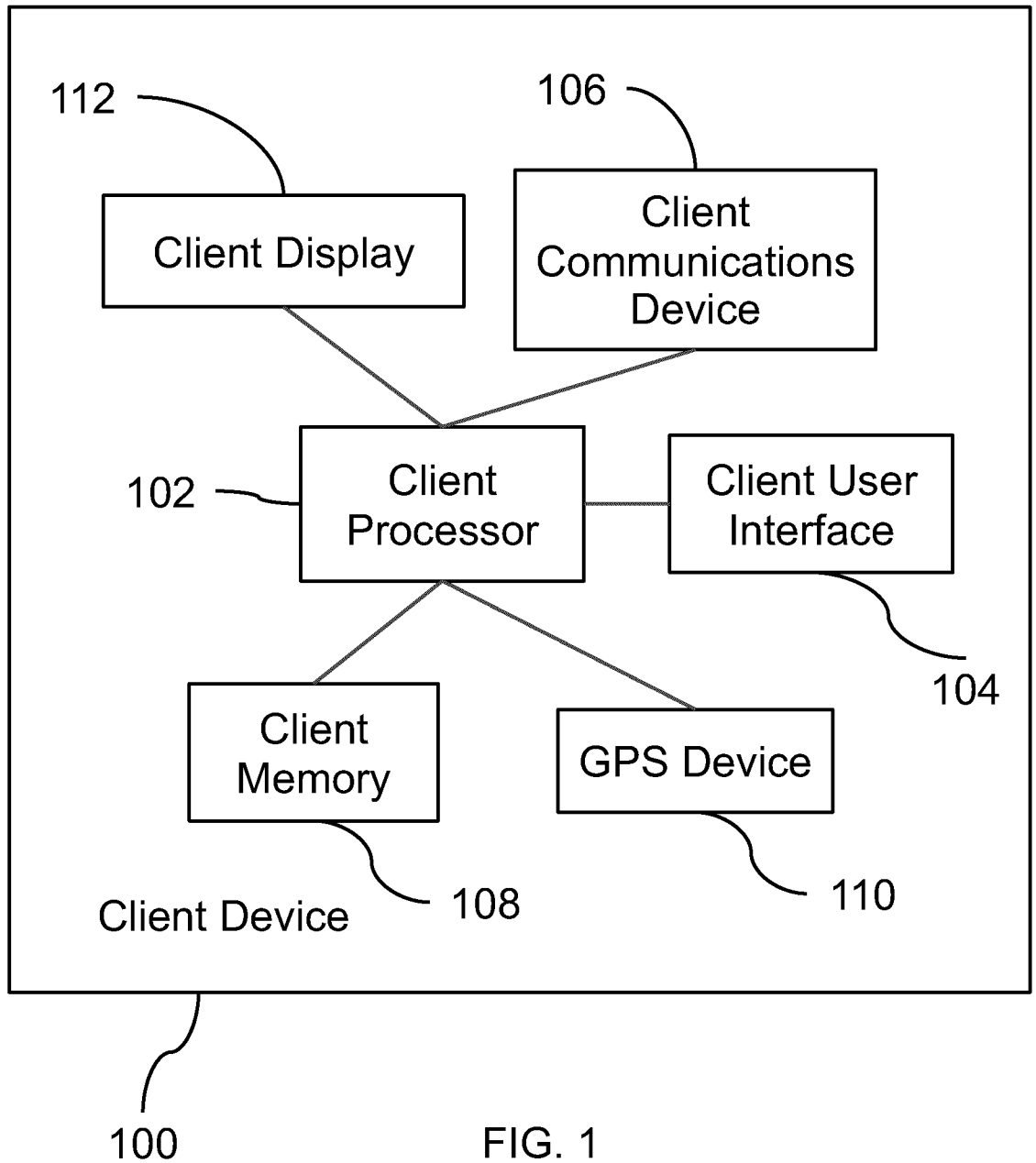
FIG. 1 is a representative schematic diagram depicting an embodiment client device.

The following is a list of the figure numbers as used in the figures.

100 Client Device
102 Client Processing Device
104 Client User Interface
106 Client Communication Device
108 Client Memory Device
110 Client GPS
112 Client Display
200 Server
202 Server Processing Device
204 Server Communication Device
206 Server Memory Device
300 Collect Usage Data from Graphical User Interface
302 Transform Collected Usage Data
304 Identify User Intention
306 Select Prefabricated Component Corresponding to Identified User intention
308 Return data on User interaction with the prefabricated component
400 Graphical User Interface
402 Mouse Pointer
404 Default Prefabricated User Interface Component
406 Prefabricated User Interface Component Associated with User Intention A
408 Prefabricated User Interface Component Associated with User Intention B
700 Train lost user interface element
702 Train favourite user interface element
704 Train location user interface element
706 Train angry user interface element
708 Train orientation user interface element
710 Train idle user interface element
712 Angry User Interface Element
714 Lost User Interface Element
716 Favourite User Interface Element
718 Location User Interface Element
720 Idle User Interface Element
800 User loads page in browser/starts app on client device 802 Computing device instruments user and GUI application behaviour 804 User takes actions on web page or software application 806 Computing device recognizes user and/or GUI application behaviour and transforms data for use by a ML model 808 ML runs pre-existing model on a neural network locally on the computing device 810 ML runs pre-existing model on a neural network on a remote computing device 812 GUI application receives signal and uses a preloaded code snippet embedded in the GUI application to adapt/change/add the specific pre-existing GUI component 814 User completes the intended task 816 System records success/failure of the GUI component

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations.

All of the implementations described below are exemplary implementations provided to enable persons skilled in the art to make or use the embodiments of the disclosure and are not intended to limit the scope of the disclosure. The scope of the invention is defined by the claims.

It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings.

It should be understood that the invention is limited to the subject matter provided by the claims, and that the invention is not limited to the particular aspects depicted and described.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Referring now to FIG. 1, a schematic illustrating example components of a client device 100 is depicted.

In the illustrative embodiment, the client device 100 Includes a client processing device 102, a client user interface 104, a client communication device 106, a client memory device 108, a client global positioning system (GPS) 110, and a client display 112.

It will be appreciated that the client device 100 can include some combination of the components described or other additional components not described herein. Examples of additional components include, but are not limited to, a client physical keyboard, a personal area network device (e.g., BLUETOOTH), an audio device, etc.

Examples of client devices 100 include, but are not limited to, smartphones, tablets, desktop computers, laptop computers, thin clients, etc.

The client processing device 100 is configured to run (or execute) processor-executable instructions (or commands).

Examples of client processors include, but are not limited to, QUALCOMM systems on a chip (SOC), APPLE A8 PROCESSORS, SAMSUNG SOCs, INTEL Mobile Processors, INTEL Laptop Processors, INTEL Desktop Processors, etc.

The client processing device 100 includes client memory 108. The client memory device 108 includes, but is not limited to read only memory (ROM), random access memory (RAM), and/or persistent storage such as, but not limited to, hard drives, solid state drives (SSD), flash drives, etc.

The client memory device 108 is configured, at least in part, for storing processor-executable instructions. These process-executable instructions are configured to be executed by the one or more client processors.

The client memory device 108 stores data generated or received by the client device 100. The client memory device 108 can include, but is not limited to, a hard disc drive, an optical disc drive, and/or a flash memory drive, SSDs, etc.

The client processing device 102 can execute the operating system of the client device 100.

In embodiments where the client processing device 102 includes two or more processors the processors can operate in a parallel or distributed manner.

The client device 100 also includes a Client GPS device 110. The Client GPS device 110 determines, at least in part, a location of the client device 100 by communicating with a plurality of GPS satellites. The Client GPS device 110 can perform known triangulation techniques to determine the GPS coordinates of the client device 100.

It will be appreciated that any other suitable component for determining the location of the client device 100 can be used without departing from the scope of this disclosure. Examples of other location techniques include WiFi triangulation, approximation of location by nearest WiFi hotspot, determining a general location from an IP address, etc.

The client user interface 104 allows a user to interact with the client device 100. Examples of a client user interface 104 include a graphical user interface (GUI) displayed on a touch screen display of the client device. In some examples the GUI may be rendered by a web browser on the client device 100. Examples of web browsers include, but are not limited to, GOOGLE CHROME, APPLE SAFARI, MOZILLA FIREFOX, etc.

It will be appreciated that a user interface includes any way a user might interact with the client device. This can include, but is not limited to, a touch screen, a physical keyboard, a mouse, a microphone and speaker (e.g., an audio interface), a tactile interface (e.g., buttons, vibrations), and/or sensor interfaces (e.g., hall effect sensors, accelerometers, drop sensors, pressure sensors, etc.).

The client communication device 106 allows the client device 100 to communicate with another device over a communications network (also known as a network-connected device).

Other network-connected devices the client device 100 might communicate with include, but are not limited to, a server, other client devices, a cloud-connected hosted application, etc.

The communication device 106 can include one or more wireless transceivers for performing wireless communication (e.g., WiFi, LTE, 5G, etc.) and/or one or more communication ports for performing wired communication (e.g., Ethernet).

The client display of the client device may include a graphical user interface (GUI) that displays information in a graphical, human-comprehensible format. The GUI may include a plurality of input objects which allow the user to provide commands to the client device 100.

These client devices 100 may use desktop and mobile browsers, at least in part, to render GUIs on the displays of the respective devices. In other examples the operating system of the respective computing device is configured to render, at least in part, a GUI on the client display 112 of the client device 100.

Furthermore, these client devices 100 may be capable of running standalone applications (or apps) created for use on the client device 100. It will be appreciated that these apps are similar to mobile browsers in that they can, at least in part, render GUIs on the display of the respective client device 100.

Figure 2:
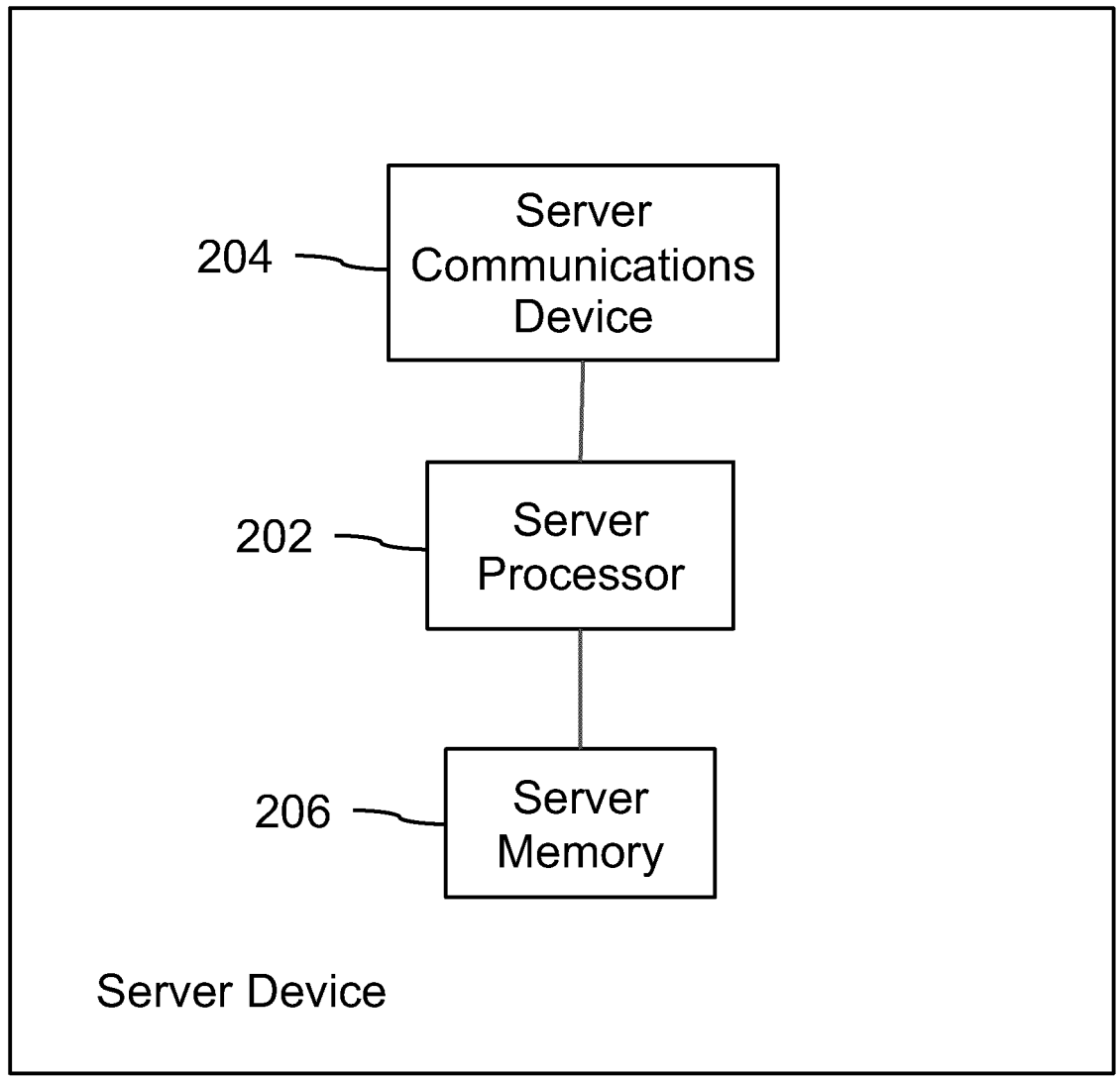
FIG. 2 is a representative schematic diagram depicting an embodiment server.

Referring to FIG. 2, a server 200 is depicted. The server 200 is configured to process, among other things, requests from a client device 100.

The server 200 includes, at least, a server processing device 202, a server communication device 202, and a server memory device 206.

The server processing device 202 includes server memory 206. Examples of server memory include, but are not limited to, read only memory (ROM) and random access memory (RAM). The server memory 206 stores processor-executable instructions and one or more processors that execute the processor-executable instructions.

In embodiments where the server processing device 202 includes two or more processors, the processors can operate in a parallel or distributed manner.

The server communication device 204 allows the server 204 to communicate with another network-connected device.

The server communication device 204 can include one or more wireless transceivers for performing wireless communication (e.g., WiFi, LTE, 5G) and/or one or more communication ports for performing wired communication (e.g., ETHERNET).

The server memory device 206 is a device that stores data generated or received by the query server. The server memory device 206 can include, but is not limited to a hard disc drive, an optical disc drive, and/or a flash memory drive. Further, the server memory device 206 may be distributed and located at multiple locations.

In some embodiments, the server memory device 206 stores a database and/or other programs and applications that are necessary for the functioning of the server.

In an aspect, an approach for updating a graphical user interface based on machine learning follows two offline training steps: 1) Training to capture distinct user behaviours and intents in the form of dynamic segments; and 2) Training to identify and classify the user according to the classes of behaviours discovered in the behavioural step.

Behavioural Segmentation involves the following steps:
Once sufficient user usage data is collected and stored, the user usage data is transformed into machine-readable format for modelling;
User usage data points that are used include: e.g. device type, user attributes, user actions, etc.;
The user usage data consists of inputs in numerical and categorical forms, with specific treatment for each input is required in order to use machine learning models;
Consider an array with rows representing distinct users and columns representing inputs describing users (such as the type of device, which site they're coming from, how long they're spending on the site, which page did they land, etc.).
Once the columns, i.e. machine learning features, are completely transformed, a clustering algorithm is applied to measure the similarity between all users that exist in this array;
Generally, the clustering algorithm maps the N number of features into N dimensions, and employs a form of distance-based metric to measure the relative similarity between one user and all other users;
This is done iteratively until a mapping for all users have been completed and clusters of users emerge;
Once distinct clusters emerge, labeling of these clusters is required (through either human intelligence or machine automated approach); and
These labels serve as a source of truth training set for identifying future users to a specific cluster given the same inputs.

Classification involves the following steps:
Still in the offline phase, a classification model is trained using the labelled information from the previous activity;
Once the model is trained to sufficient and acceptable accuracy, it will be hosted to make predictions for new incoming users that generate the data required in the classification model; and
The prediction engine, in real-time, will identify the user and serve up the appropriate design/component.

Figure 3:
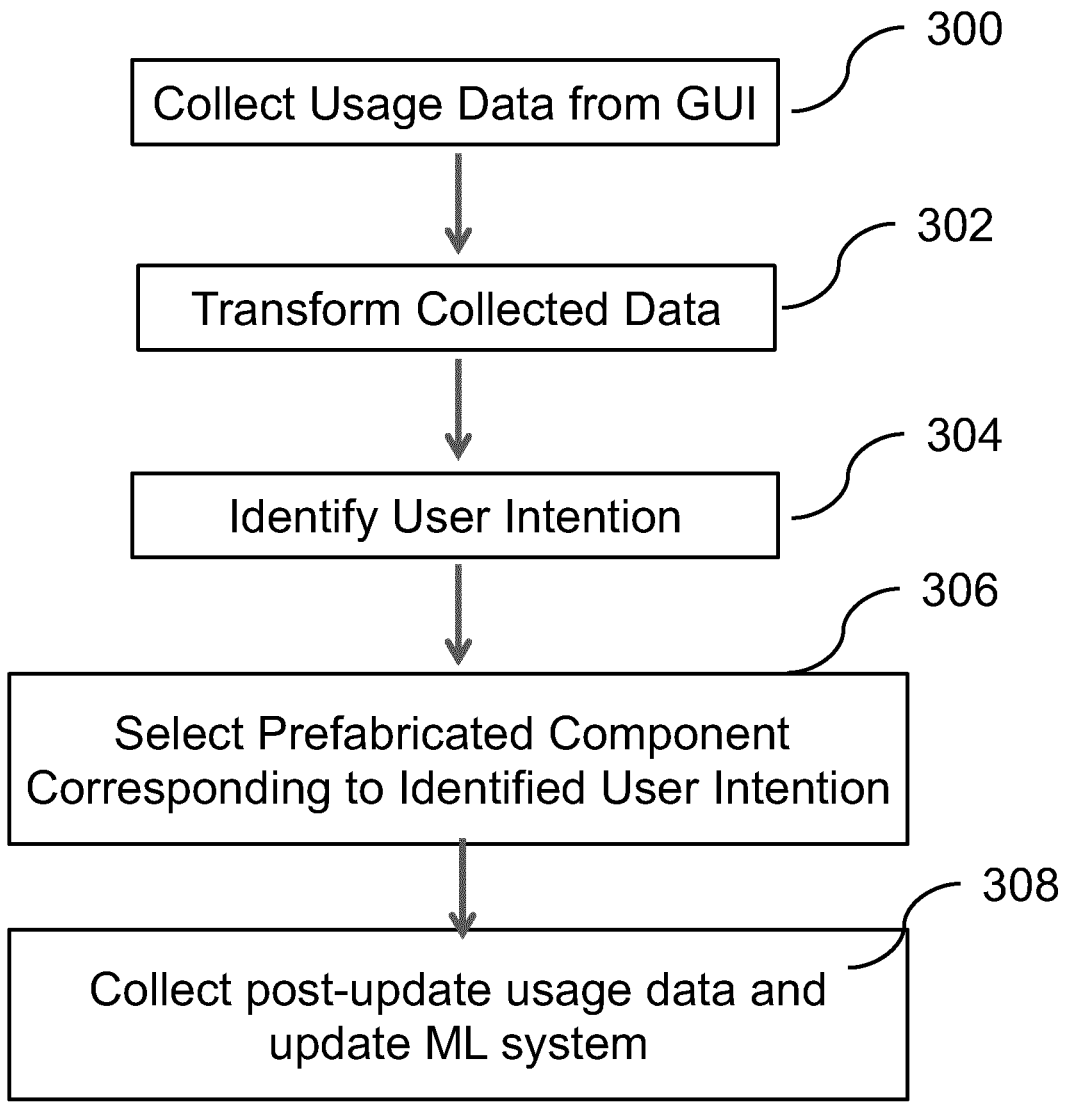
FIG. 3 is a representative flowchart depicting an embodiment of the present disclosure.

Referring now to FIG. 3 a flowchart depicting an embodiment of the present disclosure is provided.

In this embodiment usage data is first collected 300 from a displayed graphical user interface. It will be appreciated that graphical user interfaces are displayed on the display of a client device 100.

In this embodiment client device 100 is configured, among other things, to collect, store, and transmit usage data associated with a user's interactions with the GUI.

In this example the client device 100 collects data from the client user interface 104 and/or the client display 112. This data includes, but is not limited to, mouse position and/or movement data; location data retrieved from the GPS device 110; pitch, roll, and yaw data from accelerometers and/or gyroscopes; data from other sensors; time spent hovering over UI elements such as menus, buttons, scrollbars, webpage cookie data, browser tracking data, client device tracking data, etc.

This collected usage data is then made available to consumers of this data.

Examples of consumers include, but are not limited to, servers 200, applications residing on the client device 100 or the server 200, an application programming interface subscriber (API), etc.

This collected usage data is typically made available to other applications through application programming interfaces (APIs). These APIs allow consumers to access data and functionality from the client device 100. These APIs can be made available to other applications at the operating system level or at the browser level, for example.

In an embodiment the collected user data is requested via the API and then collected, by the consumer, for further processing.

In other embodiments the usage data may be streamed or otherwise transmitted to a consumer of the usage data.

In another embodiment the usage data requested via the API may be collected (or consumed) by the device on which the GUI is displayed. For example, devices with sufficient processing power and storage may store the data on the client (or local) device 100 for further transforming and/or processing.

In other embodiments the consumer is a remote server. The requested usage data is transmitted over a network (for example, the Internet) to the server, where the data is collected for processing.

In some embodiments the server is a network-connected computer in a data center. In other embodiments the server may be a virtual machine operating in a shared-computing environment (or cloud-computing environment). Examples of cloud-computing environments include, but are not limited to, AMAZON EC2, MICROSOFT AZURE, HEROKU, GOOGLE CLOUD COMPUTE, etc.

Once the usage data is collected 300 the collected usage data is transformed 302 so that it can be processed by the machine learning system to identify the user intention 304.

The collected usage data is transformed by a processor, for example, to convert it from one format to another. In this case the collected usage data would be transformed from its collected format to a format that is usable by the machine learning system.

For instance, in one embodiment usage data collected from the GUI is transformed 302 (or converted) to user interface vectors (or UX vectors).

In an embodiment, the modelling was performed by using a pre-configured machine learning model using the Tensorflow framework. The machine learning model uses a vector space model that is capable of learning the relationships between the attributes.

In the embodiment described below, the existing word2vec machine learning model provided by Tensorflow was used. Word2vec is capable of learning the relationships between the attributes provided. Then, the data was supplied to the word2vec model as a matrix (e.g. 2-D or two dimensional array). In the 2-D array, the first array holds all of the arrays (vectors) as part of data input. The vectors inside the 2-D array are all the same dimension. For example, 800 values in an array of length 800. Each of these vectors are tagged with a persona. The following personas were used: Angry User, Lost User, Favourite User, Location User, Orientation User, and Idle User. The 800 values in each vector are all floats. About, 100 floats values were taken from 8 different data points, i.e. 100 samples*8 data points=800 values for usage data. The 8 data points used were: Cursor speed, Cursor X position, Cursor Y position, Number of visits, User Latitude, User Longitude, Device Pitch, and Device Roll. For example, 100 float values for cursor speed were taken or sampled over a period of 10 seconds, 100 mouse cursor x positions were taken over a period of 10 seconds, etc. for all 8 data points until 800 float values were accumulated. All 800 data points were combined into a single vector, tagged with one of the 6 personas and inserted into the 2-D array. This populated and tagged array is then fed to the word2vec model.

In an embodiment, training was performed by building a site that contains six buttons, each button used to train one of the 6 personas. The training was done manually, following these steps: Selecting one of the 6 training personas by pressing the corresponding button; Javascript now begins to run, collecting a single float value from one of the 8 data points (e.g. Cursor speed, Cursor X position, Cursor Y position, Number of visits, User Latitude, User Longitude, Device Pitch, Device Roll) every single second. After 10 seconds the javascript stops. A total of 800 float values will have been collected. The code makes a vector of the 800 values, tags or labels it with the appropriate persona from the button pressed, and the tagged and populated 2-D array is sent to the word2vec tensorflow model. The word2vec tensorflow model will then do its own training on this data.

In an embodiment, the refinement of the model was performed empirically and by using estimation. The 8 data points were defined as part of the project, and selected for time and ease of measuring. The number of data points collected was not changed when refining the model. The 6 persona count was not changed and decided upon by the original 8 data point limit. The length of training time (10 secs), amount of values taken during training (1 float value per sec), size of each vector (800 float values), and total size of the two dimensional array (amount of 800 dimension vectors) was varied throughout the refinement process.

In an embodiment, the refinement process comprised the following steps: A size for the two dimensional array and size of each vector was chosen. The training process was conducted as mentioned above until both size decisions were met. We had an expected output based on our input. For example, we expected that if the user's mouse was left hovering over the navigation bar for more than ~10 seconds the floating action button would turn green and display the text "Site Map". The effectiveness of the chosen data size was determined by how well this output occurred. E.g. a 2-D array size of 100 data points was chosen, each vector containing 300 float values. Acting as a user, the trainer simulated leaving the mouse hovering over the navigation bar and seeing the floating action button turn green and display the text "Site Map" as expected. For other tests, the trainer didn't move the mouse. As predicted, the "Idle FAB" persona occurs after at least 10 seconds. In this case, it doesn't turn into the "Idle FAB" but instead turns in the "Fay FAB". This not being the expected behavior meant something was wrong with the chosen data size and it needed to be changed. The number of tests run to determine whether the chosen data size was good enough was arbitrary. Further testing, for example, may have tested hovering over the nay bar 10 times in 10 slightly different ways, and the 9 times we would receive the "Lost FAB" persona as expected. A subjective decision that 9 was not enough, and the data size was changed.

Once the usage data is transformed 302 the transformed usage data is processed to identify the user intention 304. The data is processed to identify a user intention associated with the collected and transformed usage data.

In an embodiment the transformed usage data is processed by a machine learning system. The machine learning system is configured to identify a user intention associated with the collected and transformed usage data.

In an embodiment the machine learning system/model word2vec is used to process the transformed usage data. Word2vec is an open-source machine learning algorithm. It will be appreciated that other machine learning systems or algorithms can be used without departing from the scope of this disclosure.

In some embodiments the machine learning system is implemented on a remote server or cloud computing environment.

In another embodiment the machine learning system (or model) is implemented as a JAVASCRIPT library that resides on the same local machine as the GUI. The machine learning system (or model) would then use the same processor as used by the GUI/User Interface to process the transformed usage data.

In yet another embodiment the machine learning system is implemented both on the server and on the client device. In this embodiment the machine learning system is trained on the server where computing power is more readily available. Once the machine learning system training is complete a trained model is distributed to the client device (s). This model can then be used to identify user intentions on the client device 100.

It will be appreciated that, in some embodiments, the machine learning system is taught to identify user intentions by being trained on training (or historical) data. That is, the machine learning system is trained (or learns) using pre-generated training data sets that correspond to specific user intentions.

For example, in some machine learning systems it would learn to identify specific user intentions based on data patterns (or anti-patterns in the case of negative training) in the training data sets.

A properly trained machine learning system is configured to identify a user intention from collected and transformed usage data. For instance, a properly trained machine learning system would be able to apply patterns it had learned during the training phase to identify patterns in the collected and transformed usage data, thereby identifying (or classifying) the user intention.

In an embodiment the machine learning system is trained via user interaction. A training user first identifies an associated action on the UI as a specific user intention (e.g., angry user). The machine learning system then learns to identify the associated action(s) with that specific user intention.

For example, an example method of training the word2vec model can include a user:
  selecting a persona button on the GUI that corresponds to a specific user intention (e.g., angry user);
  mimicking an angry user on the GUI;
  collecting GUI user data while the user is mimicking an angry user;
  stopping the data collection after a set period of time;
  tagging the collected data with additional data identifying the collected data as angry user data; and
  training the word2vec model using the tagged collected data.

In some embodiments the data collected can include, but is not limited to a float value from any one or a combination of Cursor speed, Cursor X position, Cursor Y position, Number of visits, User Latitude, User Longitude, Device Pitch, Device Roll every second.

In some embodiments the set period of time is 10 seconds. In other embodiments the data collection is configured to stop once a number of data points has been collected (e.g., 800 data points)

The training regimen may also include a refinement phase. In this phase different training variables are manipulated to refine the machine learning model. Examples of variables that can be modified include, but are not limited to, data collection size (I.e., changing the number of data points from 800 to another amount), the data collected, the number of personas (or user intentions), the method used to mimic a user intention, etc. It will be appreciated that other methods of refining the training regimen could be used without departing from the scope of this disclosure.

As depicted in FIG. 3 a user intention associated with the transformed usage data is identified by the machine learning system once the transformed usage data has been processed. The machine learning system (ML system) processes the transformed data by comparing the transformed data with historical data it obtained during the training phase. The ML system then can then identify patterns in the transformed data that correspond to intention patterns the ML system had learned during the training phase. These similar patterns can then be used to discern the probable intention of the user based on the transformed usage data.

This identified user intention is then used to modify the displayed GUI without the need to modify the implementation of the graphical user interface 306. That is, the GUI will be updated in response to the identified user intention without having to modify the underlying code of the GUI.

For example, in the scenario where the identified user intention is to add an item to a cart the system modifies the displayed GUI by adding, without any code changes, a floating "Add to Cart" button. In this case the machine learning system identifies from the usage data that the likely is considering adding an item shown on the GUI to the cart. In these scenarios the system modifies the GUI by displaying an "Add to Cart" button near the mouse cursor position.

In some embodiments the identified user intention is associated with a prefabricated user interface component (or GUI element). Pre-fabricated user elements do not require any additional code (or modification of code) in order to be added to the GUI.

Examples of pre-fabricated user interface components include, but are not limited to, already implemented buttons associated with specific functionality, different color schemes, windows, drop-down lists, and any other user interface element.

Once the GUI has been updated with the prefabricated user interface component data is returned to the ML system on how the user interacted with the prefabricated user interface component 308. In this embodiment additional data related to the task that the user completed (i.e., post-completion data) is collected from the client device 100. This data is then transformed and sent to the ML system.

This post-completion data is then used by the ML system to determine whether the GUI change was a success or a failure. The ML system processes the post-completion data along with the previously collected user and GUI application data, uses to refine its heuristics for identifying a user's probable intention.

In this embodiment if a user completes the intention by using the prefabricated user interface component that was presented to the user then the GUI change is considered a success. If the user does not use the prefabricated user interface component to complete the intention but instead uses another part of the GUI then the GUI change is considered a failure. It will be appreciated that other events or actions could be used to determine whether the GUI change is a success or failure such as, but not limited to, hovering over the prefabricated user interface component, performing an action that is influenced by, but not necessarily related to the prefabricated user interface component (e.g., opening a chat window instead of using the prefabricated user interface component to compose an email), or hovering over some other part of the GUI.

Figure 4:
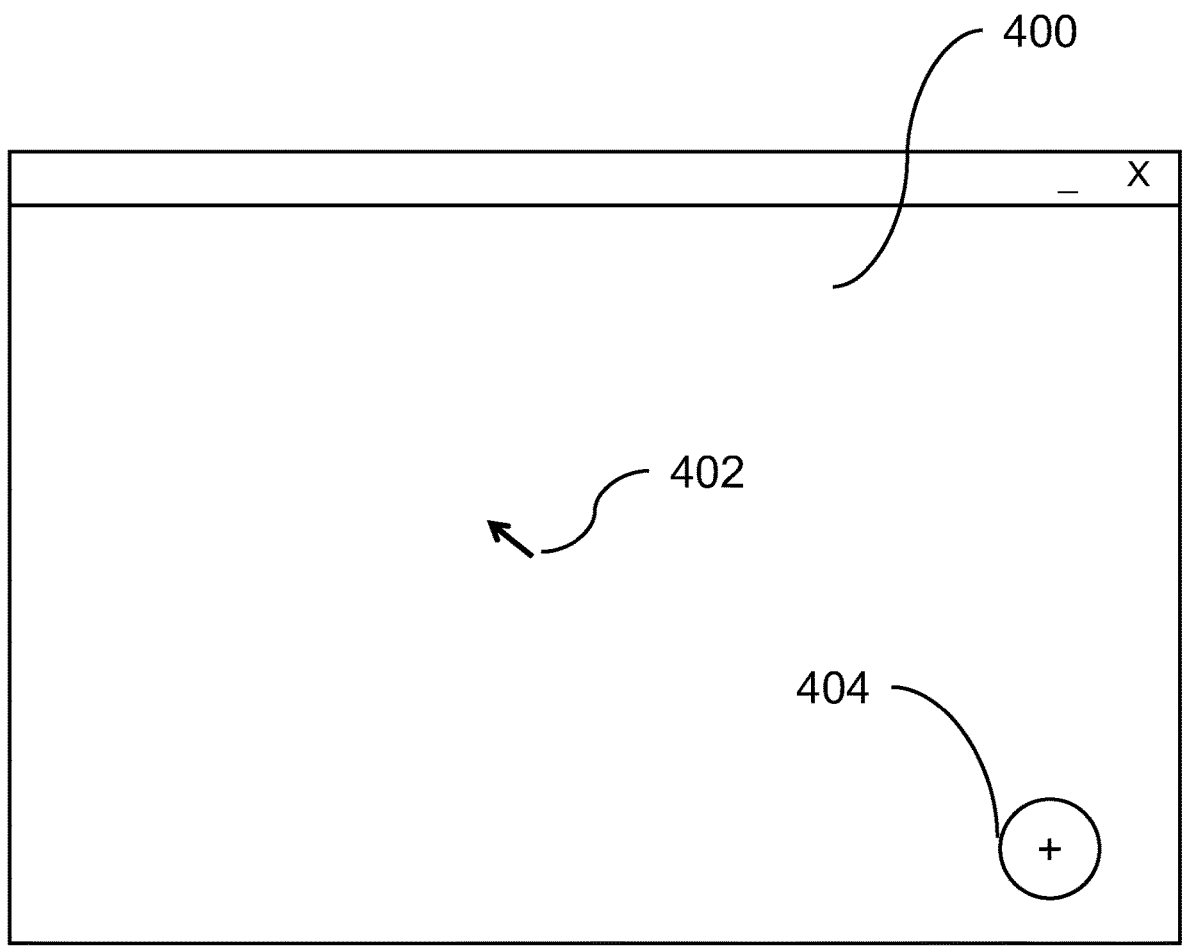
FIG. 4 is a representative drawing depicting a graphical user interface as presented to a user.
Figure 5:
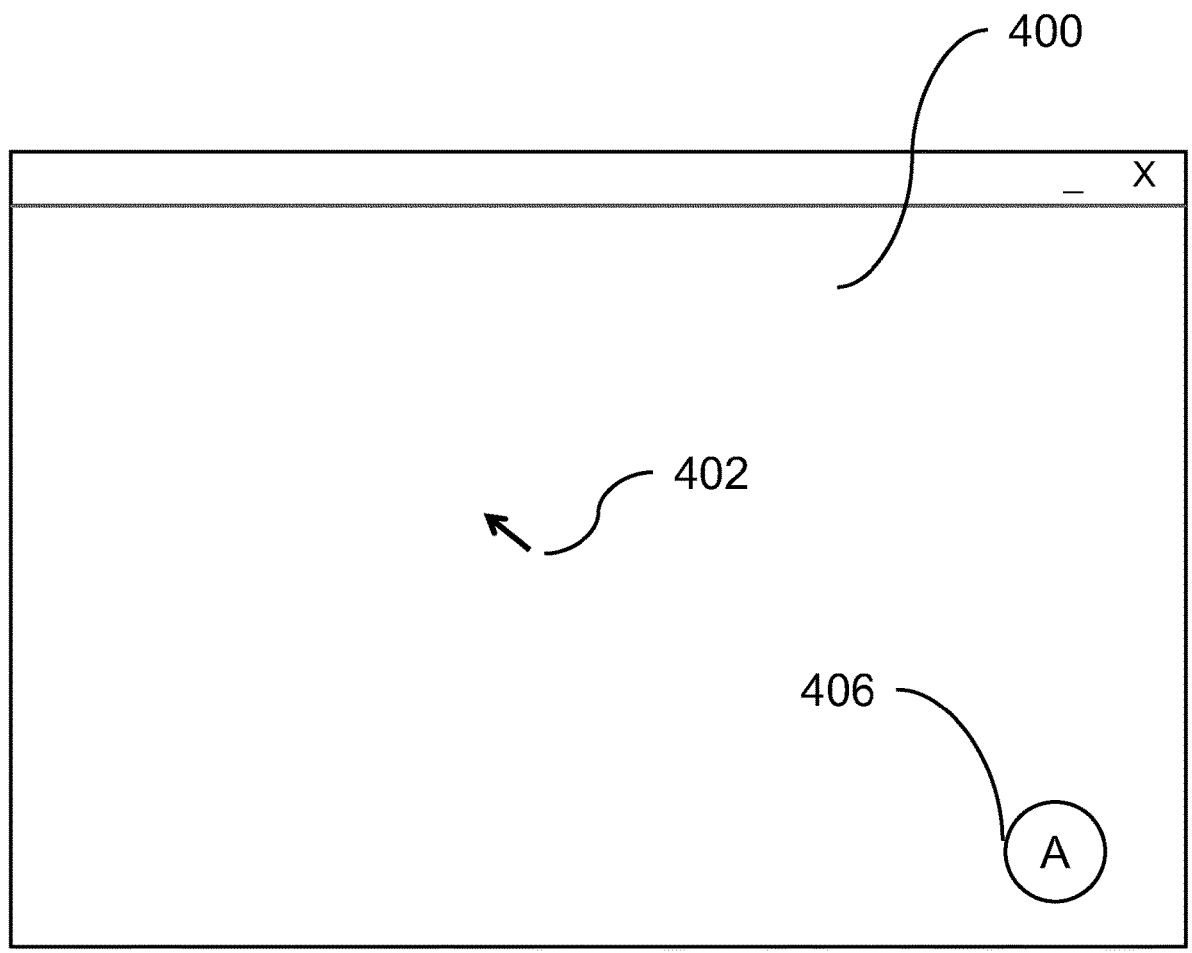
FIG. 5 is a representative drawing depicting a graphical user interface as presented to a user having a prefabricated user interface component.
Figure 6:
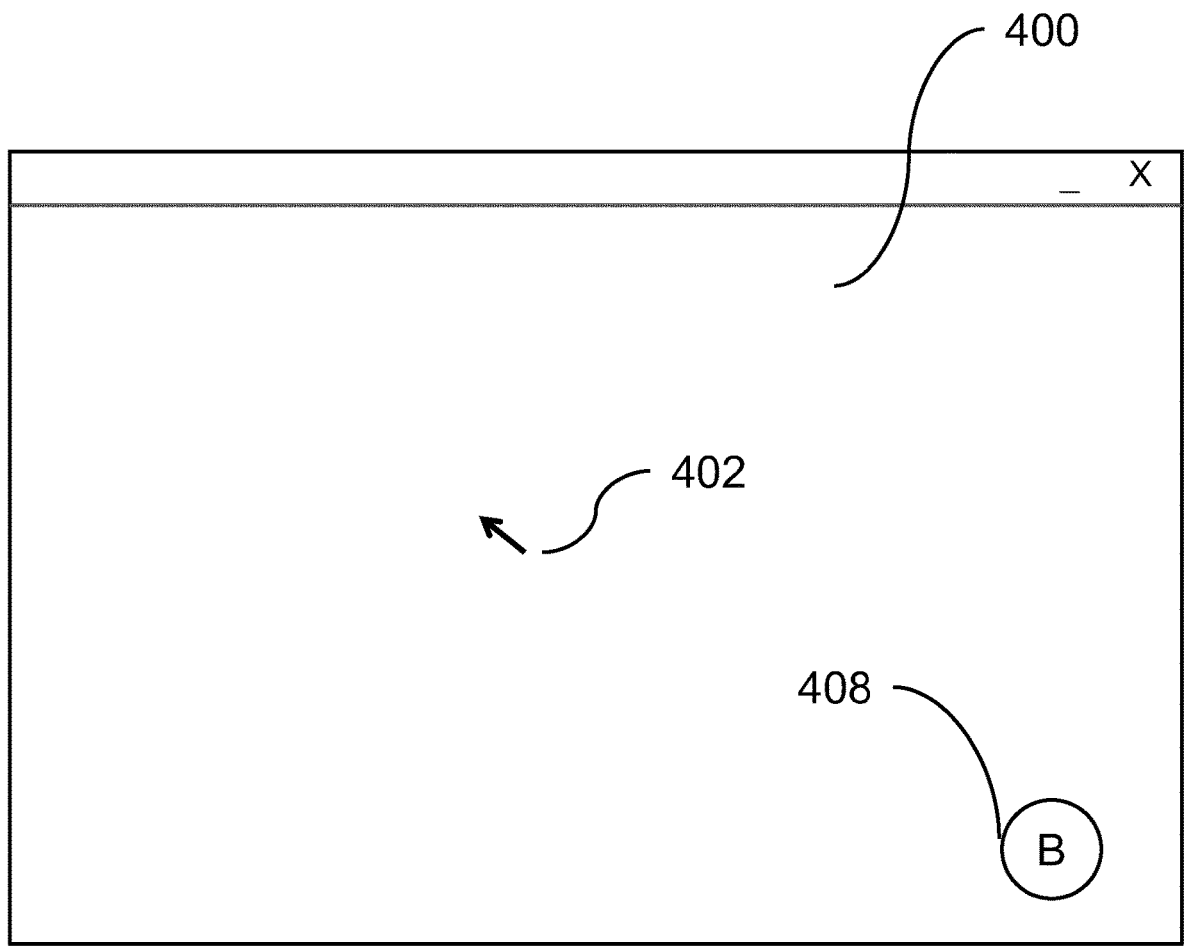
FIG. 6 is a representative drawing depicting a graphical user interface as presented to a user having another prefabricated user interface component.
Figure 7A:
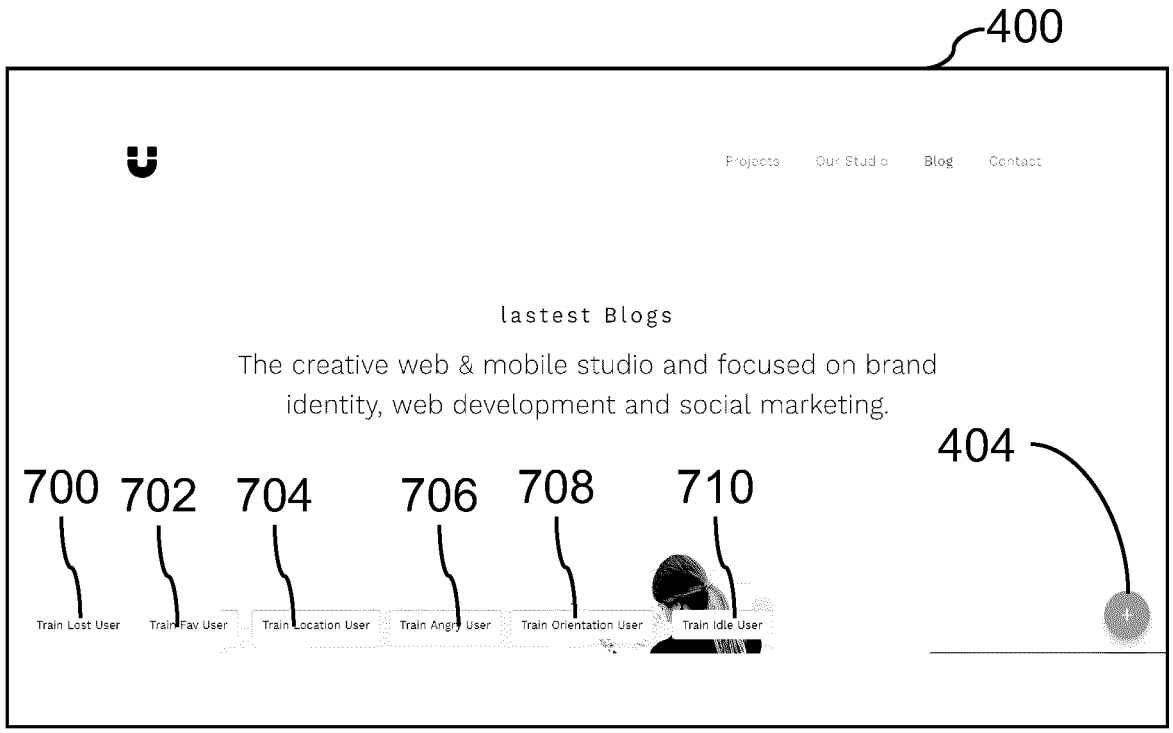
FIG. 7A is an embodiment of the graphical user interface showing a default floating action button.
Figure 7B:
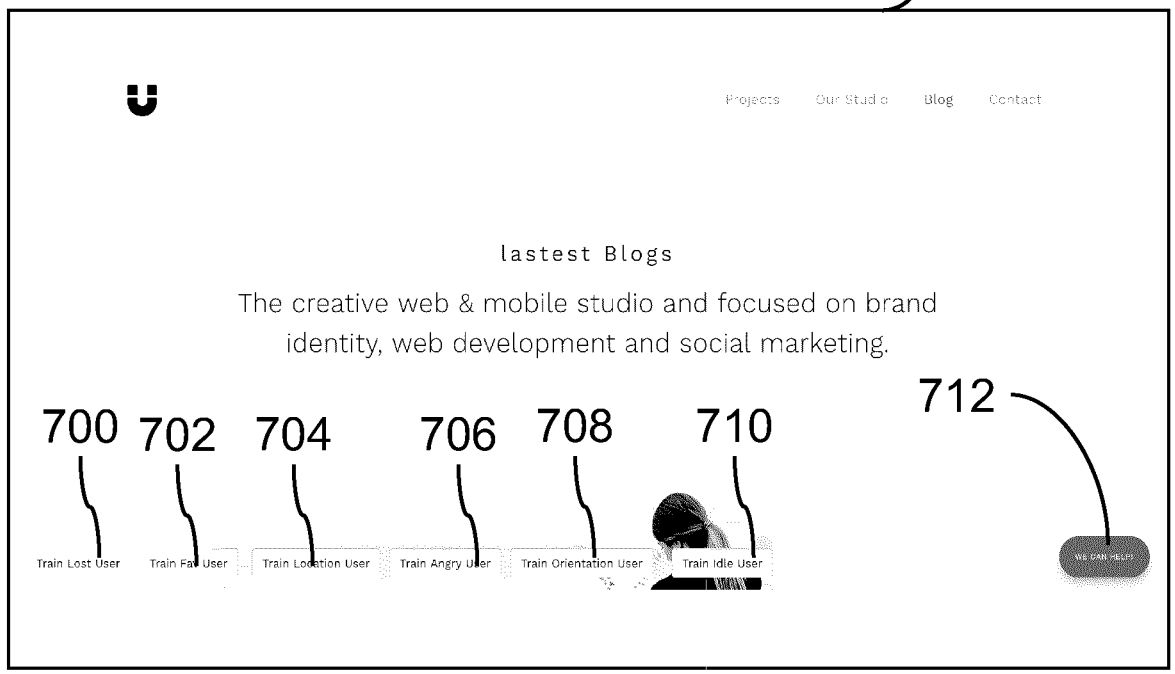
FIG. 7B is an embodiment of the graphical user interface showing an angry user floating action button.
Figure 7C:
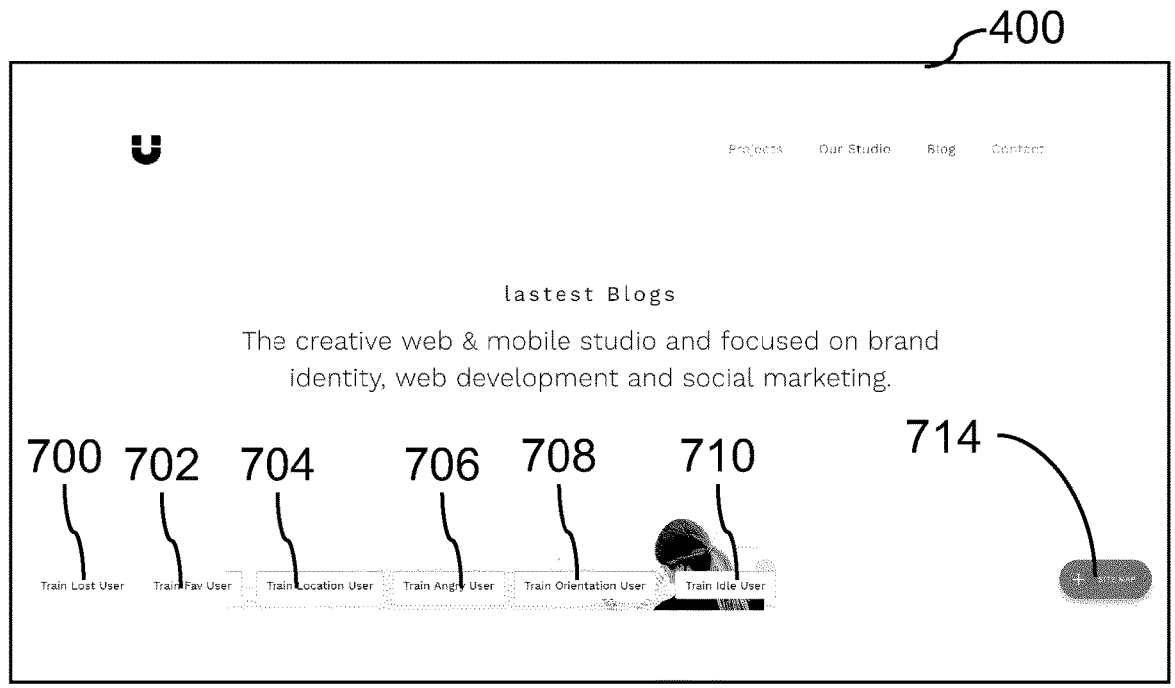
FIG. 7C is an embodiment of the graphical user interface showing a lost floating action button.
Figure 7D:
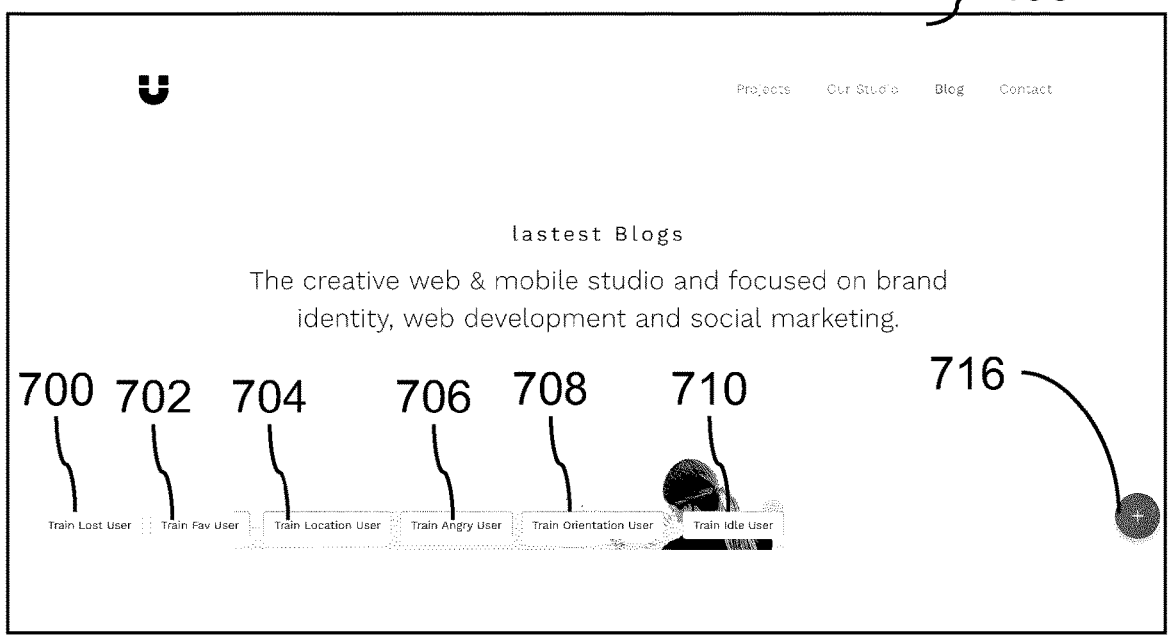
FIG. 7D is an embodiment of the graphical user interface showing a favourite visitor floating action button.
Figure 7E:
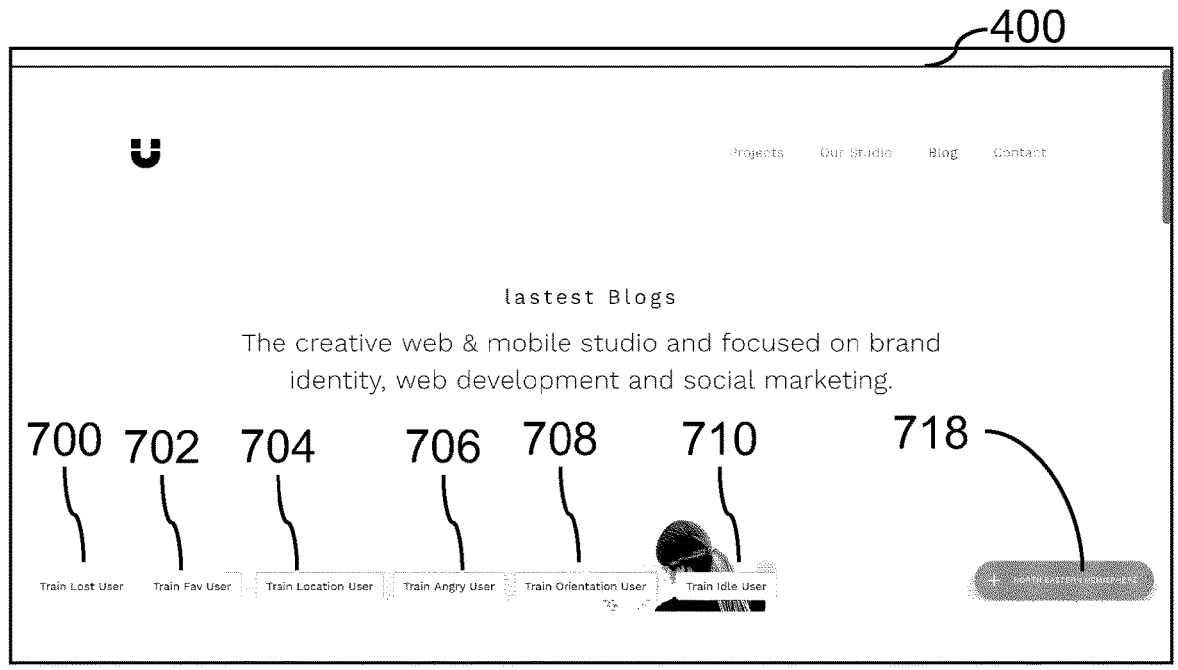
FIG. 7E is an embodiment of the graphical user interface showing a location floating action button.
Figure 7F:
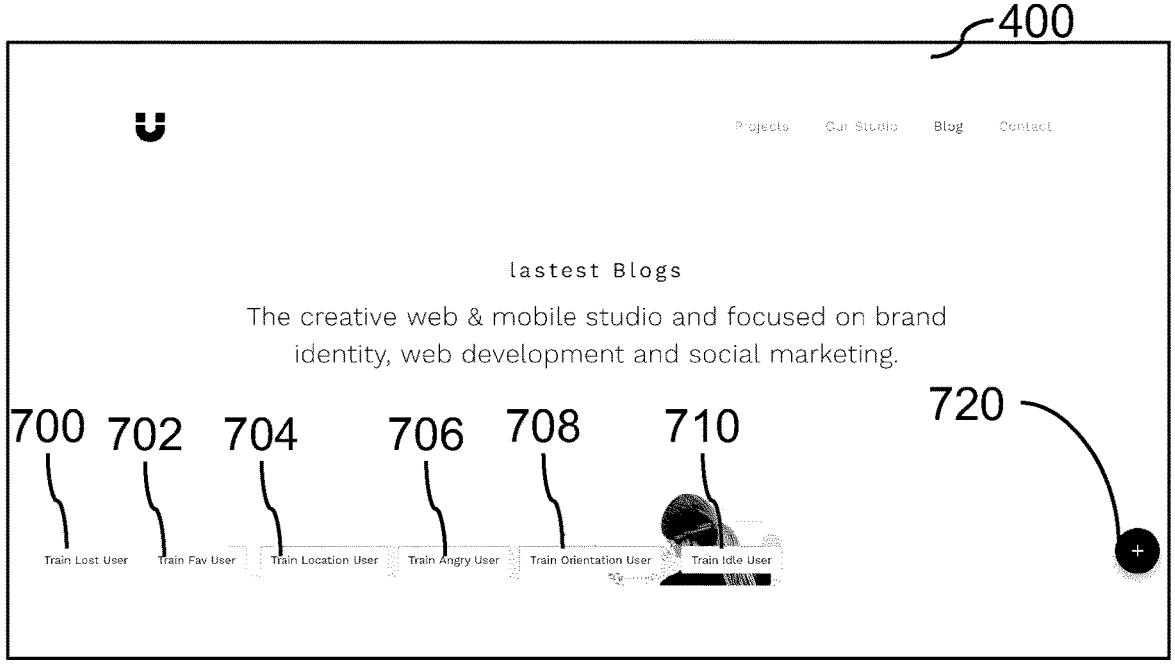
FIG. 7F is an embodiment of the graphical user interface showing an idle floating action button.

The sequence FIG. 4 to FIG. 6 depicts how a GUI 400 is modified based on an identified user intention. Referring now to FIG. 3, a GUI 400 is depicted. In this example the GUI 400 is in a start, or unmodified state. The GUI 400 includes a default user interface component 404.

In this example a user moves the mouse cursor 402 rapidly in one or more directions when frustrated.

This usage data (I.e., the rapid mouse movement) is collected. In an embodiment the collected data is transmitted to a cloud-based server for transformation and processing. For instance, this usage data is collected by the browser rendering the GUI 400, then transmitted to the server hosting the cloud (or web) based application for transformation and processing.

Once the collected usage data is received by the server hosting the web-based application the collected usage data is transformed. The usage data is transformed so that it can be processed by a machine learning system.

Once the usage data is transformed it is then sent to the machine learning system for processing. The machine learning system, using patterns learned during previous training runs, then classifies (or identifies) a user intention based on the transformed usage data.

In this case depicted by FIG. 5 the usage data includes data associated with rapid and erratic mouse movement. The machine learning system would likely identify that the transformed usage data is consistent with an angry or frustrated user.

One the machine learning system has identified the likely user intention (in this case, an angry or frustrated user), the server hosting the cloud based application is configured to modify the GUI to display a prefabricated (I.e., pre-coded) user interface component (or GUI element). In this example the default user interface component 404 is replaced by a prefabricated user interface component A 406 that is associated with an angry or frustrated user.

In the case depicted by FIG. 6 the usage data includes data associated with an idle or non-responsive user (e.g., no mouse movement, no device movement, etc.). In this case the machine learning system would likely identify that the transformed usage data is consistent with a non-responsive user.

Once the machine learning system has identified the likely user intention (in this case an idle user) the GUI is updated to replace the default (or existing) user interface component 404 with prefabricated interface component B 408 that is associated with an idle user.

Referring now to FIG. 7A to FIG. 7F, an embodiment user interface for training the ML system is depicted.

In this embodiment the GUI 400 includes training user interface elements used to train lost user 700, train favourite user 702, train location user 704, train angry user 706, train orientation user 708, and train idle user 710.

In this embodiment a training user (or trainer) first selects one of the training user interface elements. The user then performs actions on the client device 100 that corresponds (or mimics) to the training user element selected. For instance, the trainer might move the mouse and/or client device 100 erratically once the train angry user interface element 706 is selected in order to mimic the actions of an angry user.

Once the trainer has performed the action corresponding to the training user element selected, the trainer may optionally select a new prefabricated graphical user interface element (712-720) that the trainer would like to associate with the action and training user element. For instance, in the case of training an angry user, the trainer would select the angry user interface element 712 in FIG. 7B.

The training data collected during the training run is then sent to the ML system for processing. The ML system processes the data and associates the actions performed by the trainer to correspond to the training user element selected. Furthermore, if a prefabricated GUI element is also selected then the ML system further associates the selected prefabricated GUI element with the actions that were performed by the trainer and the training user element selected.

It will be appreciated that the sequence of steps to train a ML system can be varied without departing from the scope of this disclosure. Furthermore, other known methods of training a ML system can be used. For instance, historical datasets can be loaded directly to the ML system to train the ML system without any interaction by the trainer.

Figure 8A:
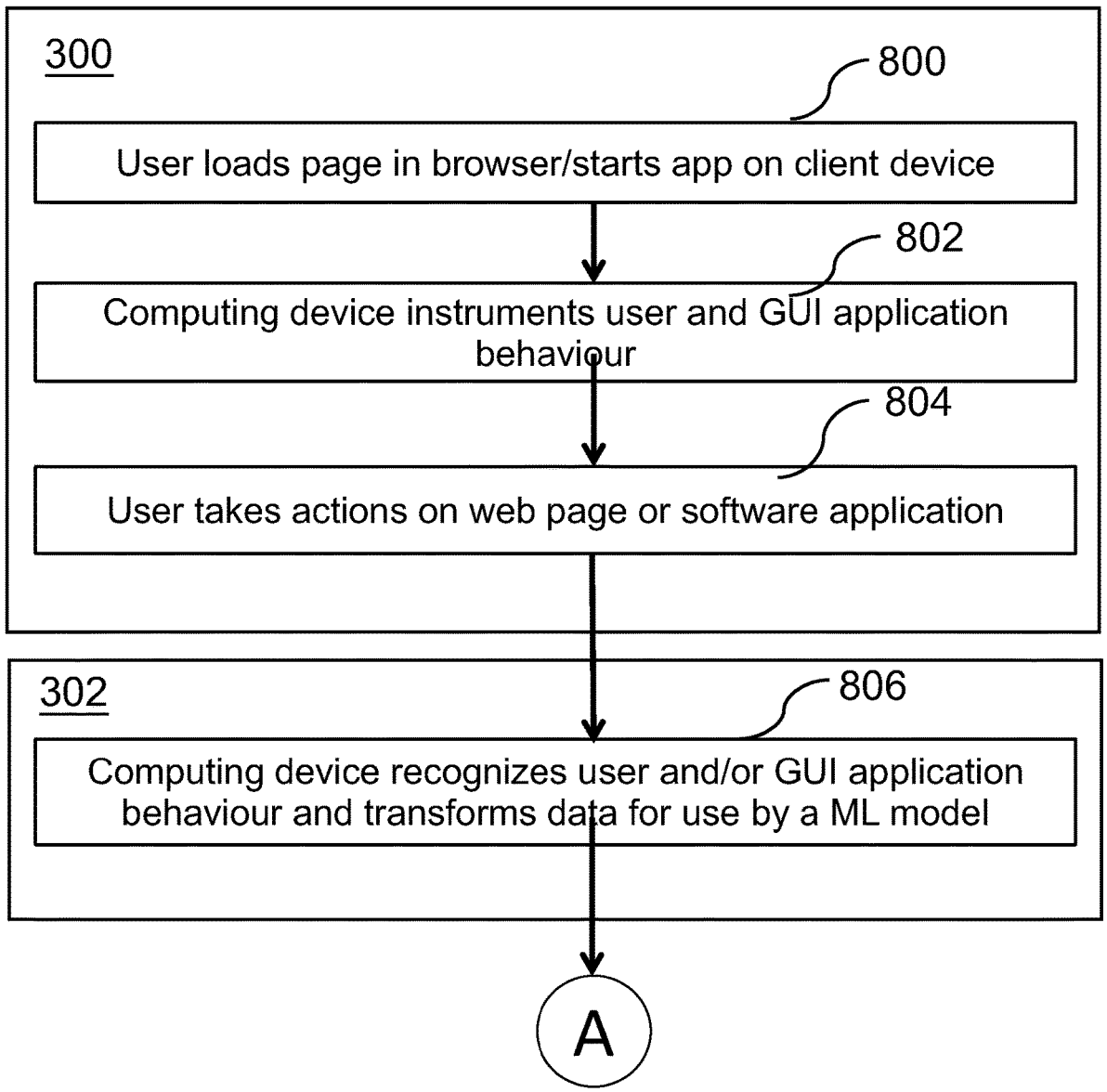
FIG. 8A is a representative flowchart depicting an embodiment of the flowchart of FIG. 3.
Figure 8B:
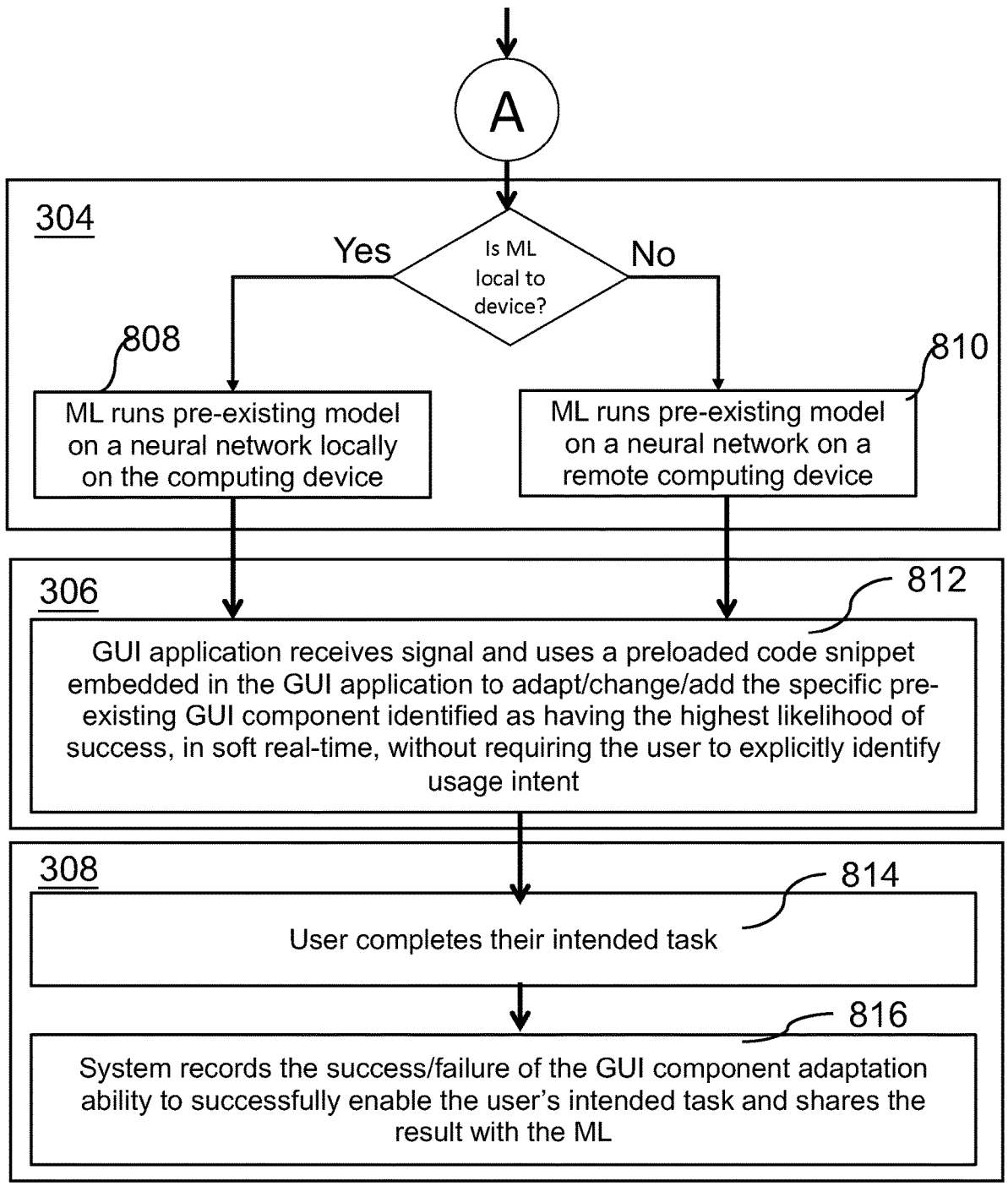
FIG. 8B is a continuation of the representative flowchart of FIG. 8A.

Referring now to FIG. 8A and FIG. 8B, a flowchart of another embodiment of the present disclosure is depicted. The figures depicts an embodiment of the steps of FIG. 3 in additional detail.

FIG. 8A Steps 800-804 depict step FIG. 3 step 300 in greater detail. In this embodiment the user first loads the browser page on the client device (FIG. 8A 800). In some instances the client device may be capable of running apps. In these instances the browser page (or GUI) is displayed on the client device 100.

The client device 100 then instruments the user and GUI application behaviour FIG. 8A 802. That is, the client device 100 collects information on how the user is using the client device 100 with a focus on how the user is using the user interface of the client device 100. This information can include, but is not limited to, log data, client device sensor data, data from website cookies, and other data.

At this point the user then takes action on the web page or app 804 data. As the user takes action, information regarding the user's interaction with the client device 100 is captured.

FIG. 8A step 804 depicts FIG. 3 step 302 in greater detail. In this embodiment the information is first pre-processed by the client device 100. The client device, in this embodiment, can recognize information related to the user's interaction with the GUI and/or the client device 100. For example, the client device may be configured to only consider data that is relevant to the user's interaction with the GUI and/or the client device 100. For instance, in some embodiments the client device 100 may consider data such as mouse movement or accelerometer data but ignore other data such as temperature or battery level.

By first recognizing, filtering, or otherwise considering only GUI application behaviour the amount of extraneous data (or noise) transformed for use by the machine learning (ML) model can be reduced. This not only reduces the transformation workload on the computing device 100 but also reduces the amount of extraneous data (or noise) sent to the ML model.

Once the data has been transformed it is then transferred to a ML system for processing. As was previously discussed, the ML system can either be local to the client device 100 or on a remote server. In this embodiment the client device 100 has the option to either use the ML system local to the client device 100 or to use the ML system on the remote server. The client device 100 then has the option to offload processing of the transformed data to the remote server. This may be useful in scenarios where the processor of the client device 100 is occupied with other computations.

Once the ML system receives the data it processes it, as was previously discussed in the present disclosure, to discern the user's probable intention.

Referring now to FIG. 8B 812, the ML system then signals the application (or webpage) with the results of the processing. The application (or webpage) then modifies the GUi to display the prefabricated component (or pre-existing GUI component) that the ML system has identified as having the highest probability of success.

It should be noted that this change is done without the user having to explicitly identify usage intent. For instance, rather than the user having to click on the "Contact Us" button to obtain contact information the system will modify the GUI to show a "Call Us" button if the ML system determines, via usage data, that the user is intending to obtain contact information from the app (or webpage).

Referring again to FIG. 8B, once the prefabricated GUI element is presented to the user, data is collected about how the user interacts with the GUI as was discussed earlier. In this embodiment data regarding the user completing its intended task 814 is collected. This data is then sent to the ML system. The ML system then processes this data and records whether the GUI adaptation was a success or a failure 816. In this embodiment the ability of the prefabricated GUI element to help the user complete the task is considered a success. If the user instead uses another element to complete the task then the GUI adaptation is considered a failure. The ML system then uses this data as historical data to further refine the ML system.

In an aspect, there is provided a method for adapting a graphical interface based on no prior session data.

Figure 9:
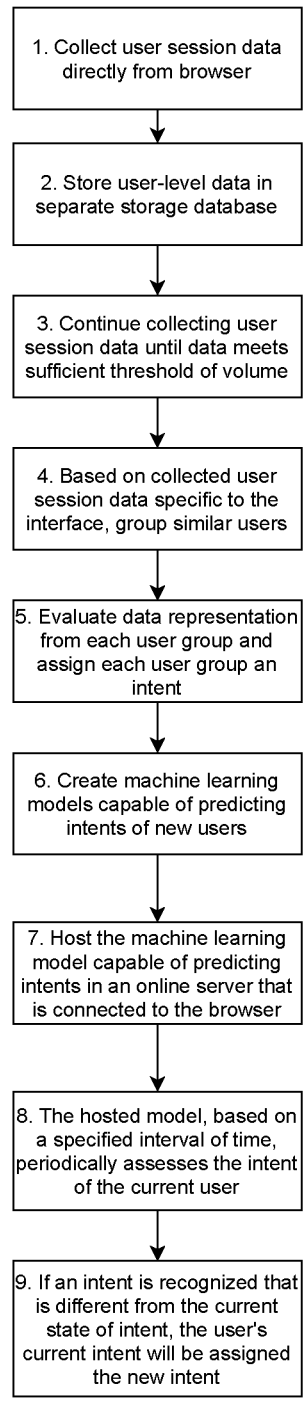
FIG. 9 is a flowchart showing an embodiment of the present disclosure.

In an embodiment, referring now to FIG. 9, the flow chart details the steps that are taken to adapt an interface that comprises lower-level functional components when there is no prior historical user interaction data for the specific interface. The steps are: Collect user session data directly from the graphical user interface or web browser; Store user-level data in a storage database, the storage database may be hosted on the site or away from the site; Continue collecting user data until data meets sufficient threshold of volume; Based on collected user-session data specific to the domain/site, group similar users; Evaluate data representation from each user group and assign each user group an intent; Create machine learning models capable for predicting intents of new users; Host the machine learning mode capable of assigning new users to an intent in an online server or network accessible server that is connected to the graphical user interface or the web browser; The hosted model or accessible model, based on a specified interval of time periodically assesses the intent of the current user interfacing with the site or graphical user interface; and, If an intent is recognized that is different from the user's current state of intent (which can be no intent recognized), the user's current intent within the session will be assigned to the new intent. And, in an embodiment, as the user continues to interact with the site interface, graphical components where predesignated to be able to adapt to different variations check the user's current state of intent to ensure that the components' variation correspond to the appropriate intent. In an embodiment, FIG. 9 as shown with numbered steps 1 to 10 are not limited to a sequential ordering. For example, steps such as collecting, storing, and continued collection may occur substantially in parallel and iteratively.

Collecting user-session data directly from the graphical user interface or the browser. Data attributes on users may be directly retrieved from the web browser. These attributes include but are not limited to:

Referring Source Site (which site the user is arriving from);
Device type (Tablet, Mobile or Desktop);
Session identifier (unique ID that identifies a particular session);
User identifier (unique ID that identifies a particular user);
Browser Operating System (IE, Chrome, Firefox, etc.);
Length of time spent during the session;
The time of day, week and year the session took place;
Number of pages viewed during the session;
The specific page paths interacted by the user during the session;
Specific actions and/or events triggered by the user during the session that relate to the site (i.e. 'clicked add to cart', 'visited the sale page');
Whether the user is an existing or a new visitor;
If the user made a purchase during the session;

Some of these attributes already exist from the graphical user interface or the web browser, however many others require configuration so that the graphical user interface or web browser can send the intended data. Such as specific actions and/or events for a given graphical user interface or website.

Figures 10, 11:
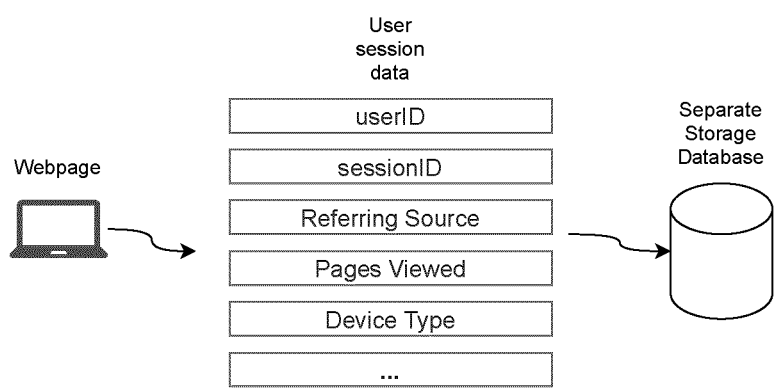
FIG. 10 is a representative drawing depicting user-session data.
FIG. 11 is a representative table depicting user-session data.

Store user-level data in a separate storage database. Referring now to FIG. 10, in this particular scenario, no prior user data is collected. User-session data is required to meet a minimum volume in order to apply machine learning models (for i.e. 10,000 users). Of the above listed data collected from a given session, the data is sent to a database for storage. Data associated with each session is referenced with the combination of UserID and the SessionID and stored in rows in a tabular database.

FIG. 10 shows the collection of user-session data in the form of attributes that are collected from the web browser and subsequently stored in a separate storage database.

FIG. 11 shows the storage of the user data is in the form of tables in a relational database where each row of entry holds predetermined data types and characteristics. For example, each row represents a session interacted by a specific user, along with the data attributes associated with that user's session such as the device that was operated on, which site the user came from, etc.

Continue collecting data until data meets sufficient threshold of volume. A threshold on the amount of sessions required to be collected is determined as the data is collected. In an embodiment, an initial rule is set for 10,000 unique users. This threshold may be amended higher or lower depending on the quality of the data that is collected.

Associating similar users and assigning them an intent based on a list of predetermined intents. Once sufficient data has been collected, machine learning models are used to assign similar users to the same group. The input for determining similarity of users is based on the collected user-session data listed above. A weighting scheme is then applied and is guided by the list of known intents that apply to users for the site.

Figure 12:
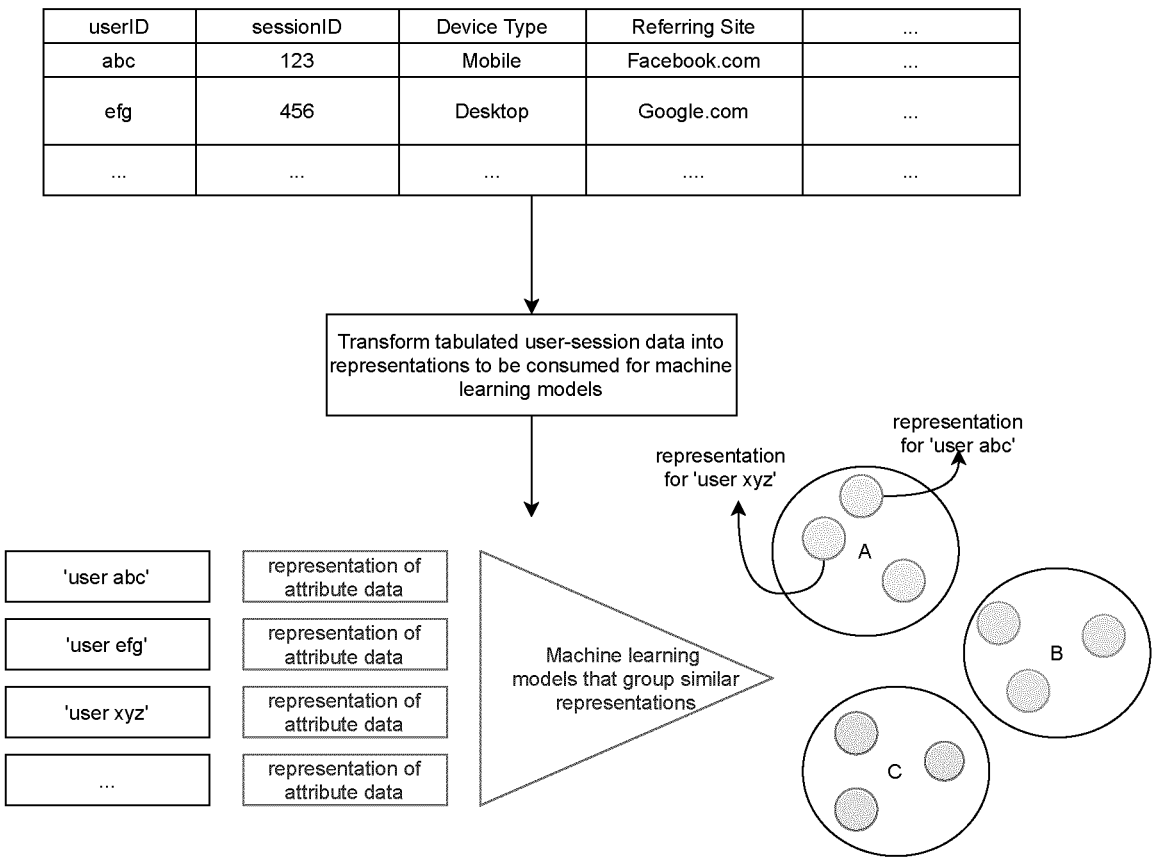
FIG. 12 is a representative drawing depicting an embodiment of the grouping of similar users.
Figure 13:
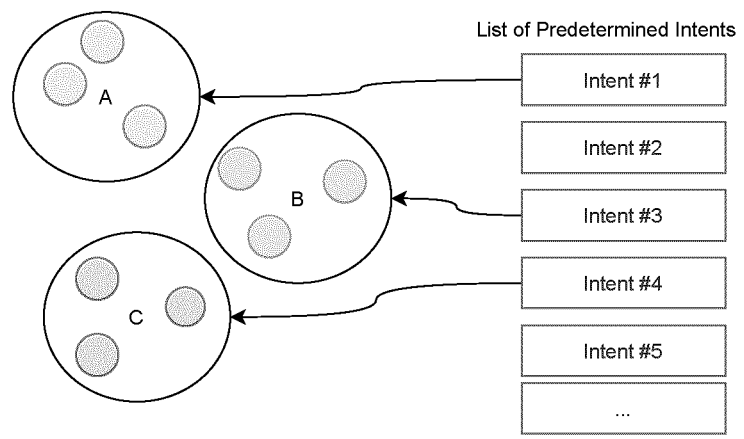
FIG. 13 is a representative drawing depicting the assignment of intents to the groupings of similar users.

Referring to FIGS. 12 and 13, there are several steps associated with assigning similar users to the same group is detailed as follows. In an embodiment, firstly, the user-session data that is stored in a separate database is retrieved and transformed so that each user has an uniquely associated (one-to-one) representation of data from the past session data. Secondly, one or many machine learning models will then be applied to determine similar data representations from the database of all users. The output of the machine learning models is distinct groupings where each group contains representations that are associated with their respective user. The database of users now has a specific group assigned to each user.

Once groupings of users are produced, each group is then assigned to an intent from a list of predetermined intents. An 'intent' is defined as an user's clearly formulated state of purpose, and can be in various forms. In an embodiment, functional, task-based purposes can be intents such as completing a purchase, submitting an email, finding the customer support number, checking order history, etc. In another embodiment, higher-level user emotional purposes may be intents such as happiness, anger, frustration, annoyance, impatience, anxiousness, etc. In an embodiment, no intent may be a user intent. In an embodiment, no recognized intent may be a user intent.

The intents are non-overlapping and no two intents can be assigned to a single group of users. The determination of which intent to be assigned to each group is completed through the assigning model.

In an embodiment, the assigning model consists of three parts that are completed in sequence: Providing summarized statistics that help describe the behaviours of each similar user group to participants through recruitment. Receiving the most appropriate intent for each similar user group evaluated by recruited participants from a list of predetermined intents. And, determining the consistency of intents provided by recruited participants through a score, and accepting the intent for the similar user group if the score exceeds a threshold.

Figure 14:
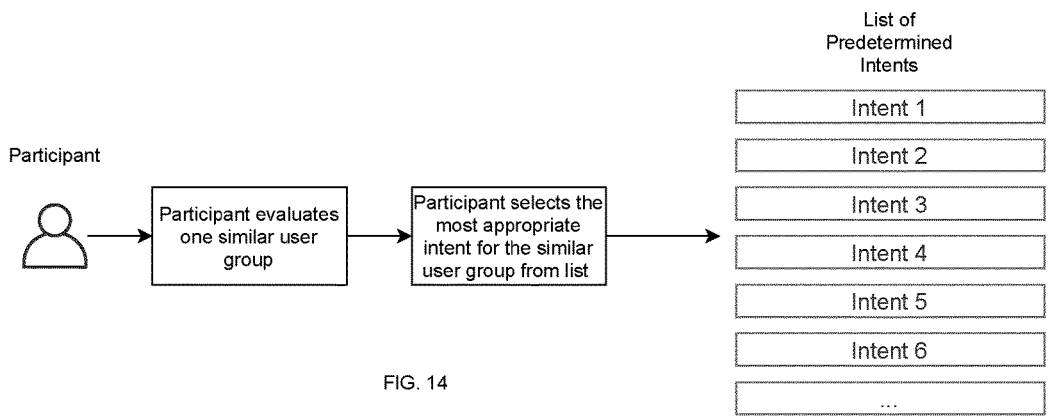
FIG. 14 is a representative drawing depicting an embodiment of the generation of training data.

Firstly, summarized statistics that help describe the behaviours of each similar group are computed from the collective collected user usage data and can be expressed as comparisons with other similar user groups. Examples of summarized statistics are:

- A single number describing any one of the user attributes for a similar user group. Two examples are: this similar user group has an average session duration of 2 minutes and 40 seconds; and, this similar user group has a standard distribution of 2.3 page paths navigated.
- Comparisons of an user attribute for all similar user groups. Three examples are: a table listing the average time of day each similar user group interacts with the interface; a column graph comparing the percentage of mobile users for all similar groups; and, a 3D bubble chart showing clusters of individual users across the 3 dimensions of time on page, time of day and session duration Referring to FIG. 14, secondly, once a participant has reviewed the summarized statistics and is ready to choose an intent, the participant selects the most appropriate intent from the list of predetermined intent. All participants must make a selection independently of other participants' selections.

Thirdly, the consistency of intents provided, for a given similar user group, is determined through a score that is the percentage of the maximum number of the same intent provided over all provided intents.

Figure 15:
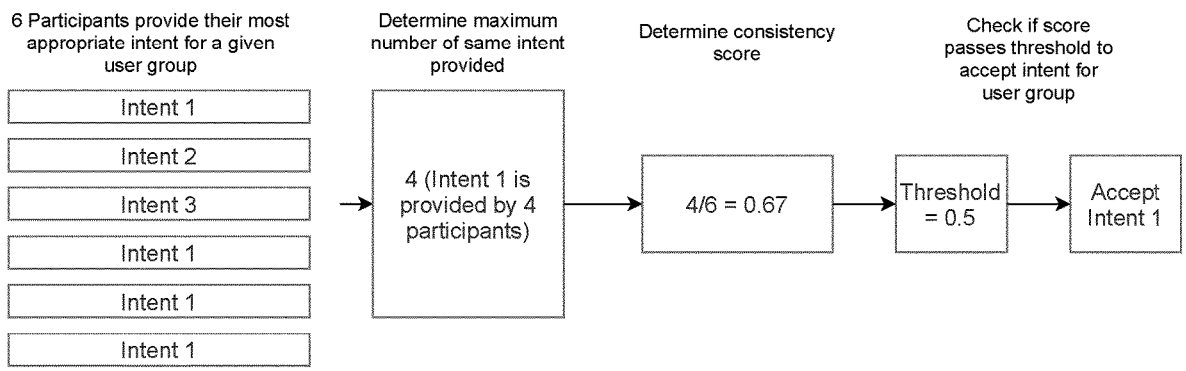
FIG. 15 is a representative drawing depicting an embodiment of the generation of training data.
Figure 16:
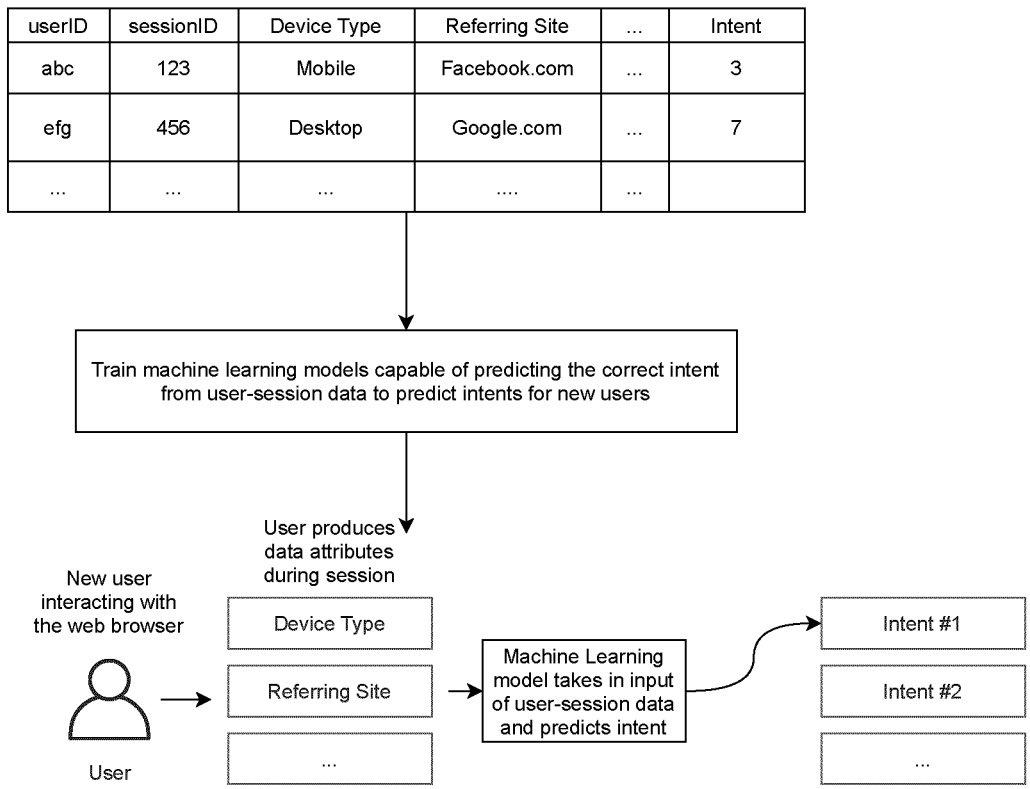
FIG. 16 is a representative drawing depicting an embodiment of the prediction of intent to a new user.

FIG. 15 is a diagram showing how the score for consistency of intents is determined—Intent 1 is chosen as the most appropriate intent for the given user group since it is the maximum number provided by participants and passes the threshold:

Once all groups are assigned an intent, the intents are then used as the outcome variable to train machine learning models that would be able to predict intents based on transformations of the user-session attributes collected. FIG. 16 shows the details of an embodiment of the steps required to predict the correct intent for a new user engaging in a session with the graphical user interface or the web browser.

Figure 17:
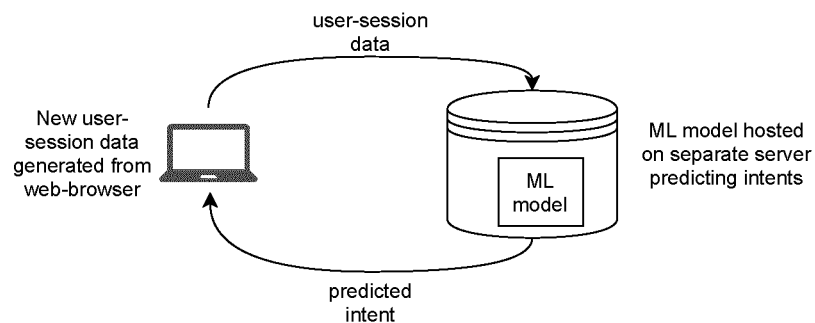
FIG. 17 is a representative drawing depicting an embodiment where the machine learning ("ML") model is hosted on a network accessible server.

Referring now to FIG. 17, in an embodiment, hosting the intent prediction model on a separate server connected to the web browser or available on the network to be able to predict intents for new sessions. The new session data matches the same format as the data that is previously stored in a database. The new session data is then directly sent to the server where the machine learning model is hosted and predicts the correct intent based on data ingested.

Figure 18:
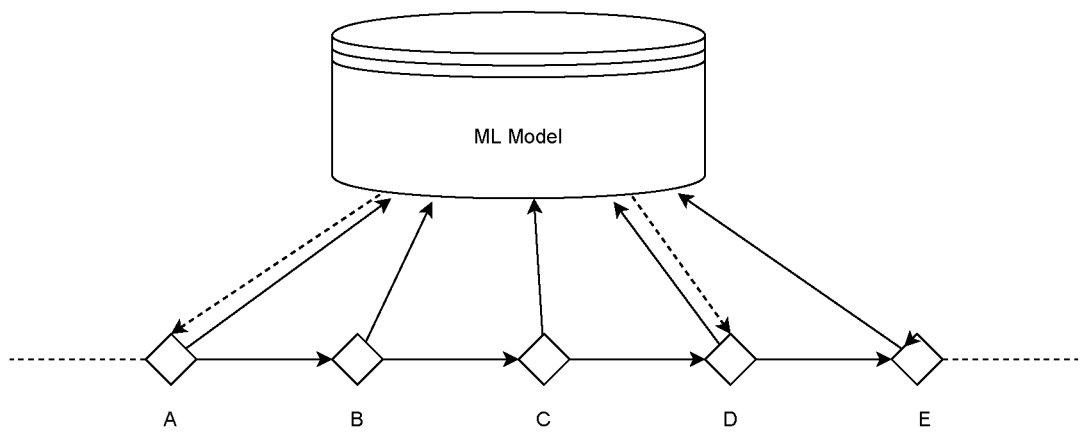
FIG. 18 is a representative drawing depicting an embodiment where the ML model periodically assesses an intent of the user.

Referring now to FIG. 18, in an embodiment, the hosted model periodically assesses the intent of the current user, based on an interval of time. The figure shows an illustration of session data periodically fed into the hosted ML model to assess the current intent of the user. Points A to E represent forward direction in time, with each point representing a specific point in time where session data (up until that point) is sent to the model. Points A & D represent points in time where session data sent to the ML model were met with predicted intents sent back to the web browser. Points B, C and E represent points in time where there is no change in predicted intent and thus, no intent is sent back to the browser.

Figure 19:
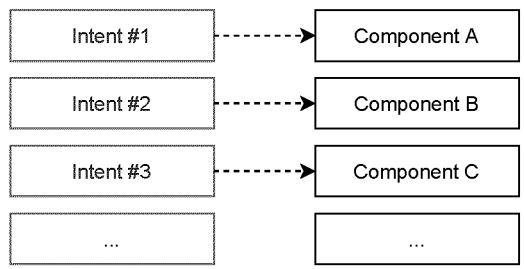
FIG. 19 is a representative drawing depicting the matching of an intent with a component.

In an embodiment, referring to FIG. 19, once an intent is determined for the user at the current time, a designated GUI component is then served to the user according to the intent. The GUI components that are assigned to each intent are predetermined; multiple components may exist to be adapted for each intent however no component may serve more than one intent.

Figure 20:
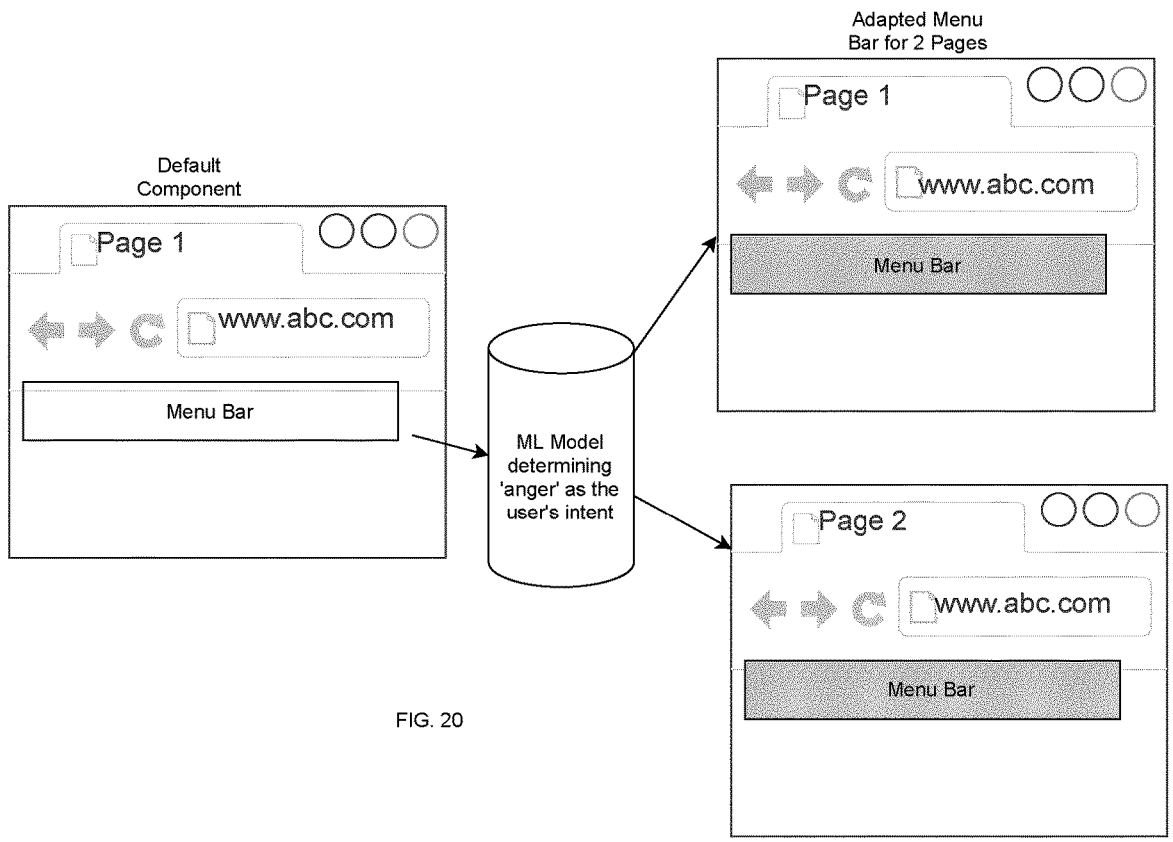
FIG. 20 is a representative drawing depicting an embodiment of the ML model providing a variant of a component in response to an intent.

For example, while the user experiences the intent of 'anger', the GUI triggers a highlighted variant of the navigation menu component on pages where it exists. Such a variant is persistent as long as no new intent (including no intent) is predicted. The GUI component and its variant associated with the intent may be shown on several web pages during the user's session, an example is shown in FIG. 20.

Figure 21:
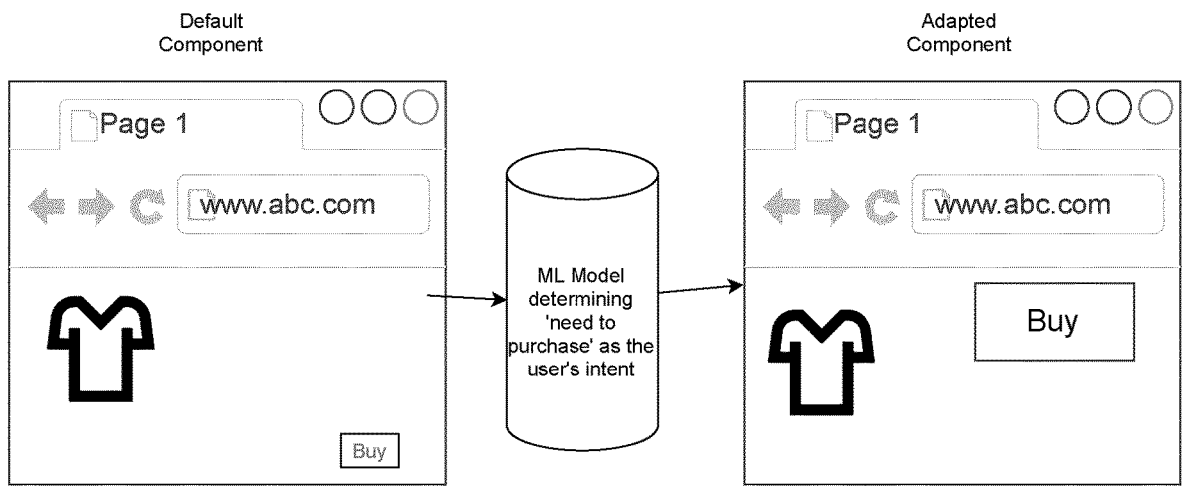
FIG. 21 is a representative drawing depicting an embodiment of the ML model providing a variant of a control component in response to an intent.

In another embodiment, referring to FIG. 21, the machine learning model predicts a functional, task-based intent such as the user needing to complete a purchase. In this scenario, when presented with a page with a path to purchase, the user sees the 'Buy' button adapt to be more prominent in both size and color to serve the intent to purchase. The adapted, more prominent variant has been predetermined to serve the specified intent.

A component is defined as any subsection of an interface. This includes subsections that serve to provide control for the user (such as a clickable button, a clickable menu bar, a typable form field, etc.) as well as subsections that do not provide control and serve as visual content (such as an image, copy/text of a webpage). Examples of control components include: Buttons, Lists, Menu bar, and Sliders. Examples of content components include: Images, Labels, Notifications, and Text Description for the body of an interface.

The adaptations that apply to components may exist in various forms—the example embodiments illustrate specific adaptations of color, size and location on page for control components of a navigation menu bar and a purchase button, respectively. Additionally, adaptations may be applied to both content and control components on a single webpage to serve specific intents. Examples embodiments of such adaptations include (but are not limited to):

Changing the Color of the Component:
  Changing the color of a 'purchase' button from white to yellow to show higher contrast to serve the intent of an user looking to make a purchase (control).
  Changing the color of the border for a product image from black to red to highlight the image to serve the intent of an user looking for the specific product (content).
Changing the Specific Image (if it Contains an Image):
  Changing the product image from a male model wearing the shoe to a female model wearing the shoe to serve the specific intent of a female user
  Changing the graphic associated with Christmas to a graphic for that is not religiously affiliated, such as a generic Holiday season one.
Changing the Location on Page:
  Changing the location of menu bar that is positioned at the top of an interface to the bottom to serve a specific intent (control).
  Changing the location of a product image that is positioned on the left side of an interface to the right side of the interface (content).
Changing the Size:
  Altering the physical size of a slider from a small one to a larger one to make the slider more prominent (control).
  Changing the size of a label for 'Free Shipping' associated with a product from a small one to a larger one to make the label more prominent (content).
Changing the Textual Description:
  Changing the text of a button from 'Support' to 'Need Help' (control), or from 'Purchase' to 'Buy Now!'.
  Changing the text of a promotional description from 'Save 15% on Footwear' to 'Take 15% off on Shoes!' (content).
Changing the Layout with Respect to a Collection of Components:
  Changing the order of presentation of items for the 'Outerwear' drop-down list from 'Coats, Jackets, Bombers' to 'Bombers, Coats, Jackets' (control).
  Changing the layout of the homepage images so that the image of a toddler model is positioned above the image of an adult model (content).

In example shown in FIG. 22, modifications to the layout of content components are shown. In the default scenario, where no intent has been predicted for the user, the layout of content components is presented in the order A, B, C, D (left to right, top to bottom). The collection of components can be modified to serve predetermined Intent 1, where the order of content components is now D, C, B, A. For intent 2, the order of the collection of components is B, A, C, D.

In another aspect, there is provided a method for adapting a graphical interface based on intents retrieved from another site. In an embodiment, the steps comprise, once groups of users are determined, determine the similarity between these new user groups and existing user groups from past sites or domains, or past graphical user interfaces, for which the models are trained to predict intents for those user groups. Then, a new user group deemed sufficiently similar to existing user group will inherit the intent associated with the existing user group. Next, in an embodiment, once all new user groups successfully inherit an intent from an existing user group, use machine learning models to create rules between attributes of the new users with the inherited intent.

FIG. 23, shows a flow chart that details, in an embodiment, the steps that involve use of pre-existing user groups and their respective intents to predict intents for new users. The flow chart of FIG. 23 differs from the one shown in FIG. 9 in the initial steps required to be taken to arrive at the hosted model. The first chart shown in FIG. 9 details steps to recognizing user intents without prior knowledge of how intents are related to user groups. The second chart shown in FIG. 23 leverages known intents associated with past user groups to effectively bypass the need to evaluate each user group and determine which intent is associated with it (skips Step 5 of the chart in FIG. 9).

For this embodiment of the workflow, begin with the initial steps outlined in the first chart and stop once user groups have been determined for the site (Step 4 in the chart of FIG. 9). Details for the intermediary steps that replace Step 5 of FIG. 9 are listed below.

Figure 24:
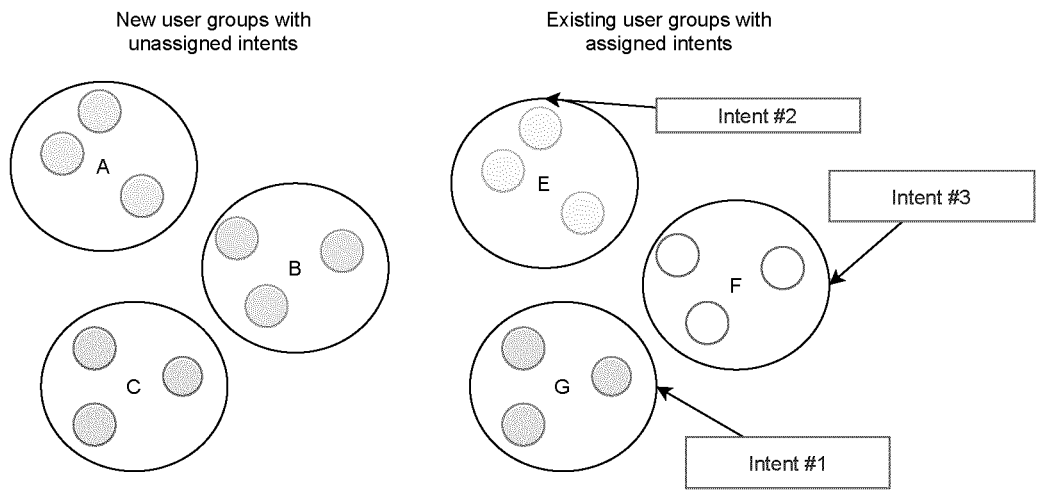
FIG. 24 is a representative drawing depicting a new group of users with unassigned intents and an existing group of users with existing intents.
Figure 25:
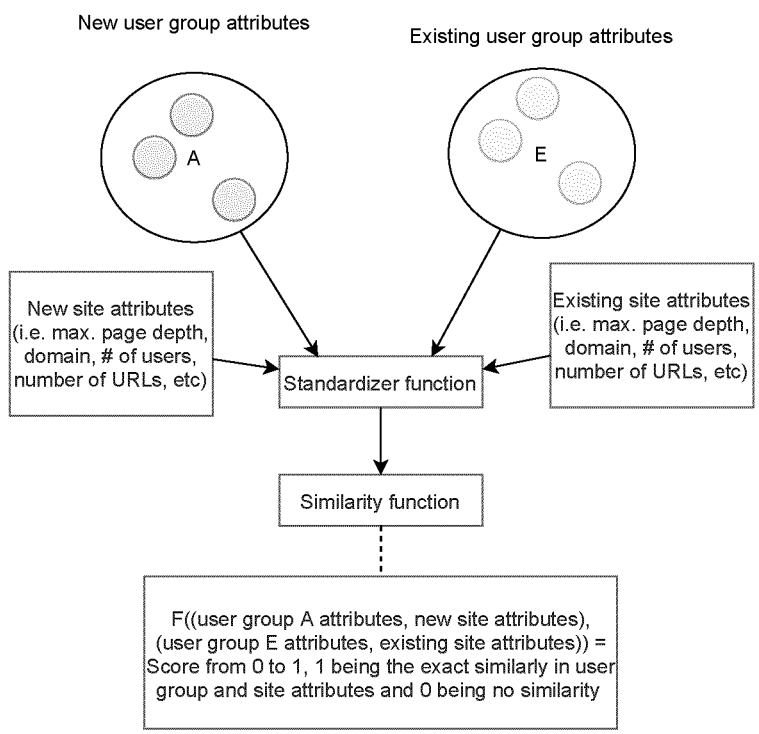
FIG. 25 is a representative drawing depicting an embodiment of the logic for comparing similarity between user groups.

Referring to FIGS. 24 and 25, in an embodiment, a) determining the similarity between new user groups with existing user groups. There is pre-existing knowledge of intents relating to particular user groups from successful executions of the workflow detailed in the chart of FIG. 9.

To determine the most similar existing user group with a new user group, a similarity function is created using machine learning to determine the degree of similarity. In this function, user-session collected in the form of data attributes specific to user groups are used as inputs to compare similarity between a pair of user groups. Additionally, site-wide attributes are also used as inputs and weighted appropriately with data attributes from users.

FIG. 25 shows an embodiment of the logic for comparing similarity between users groups. User group A is new and does not have an assigned intent. User group E is an existing user group already with an intent assigned.

In an embodiment, comparison of similarity between these two user groups is conducted by passing both the user group attributes (coming from user-session data for each user in the group) and the site-wide attributes into a standardizer function. The standardizer function serves to transform the numerical values of attributes so that different groups of users from different sites can be compared fairly. Site attributes contain data that apply on a site-wide level. For example, an attribute can be the maximum page depth of the site which corresponds to most number of pages an user could descend.

Then, once user attribute data and site-wide attribute data are standardized, they are then passed into a similarity function. This similarity function uses machine learning to determine a score of similarity between 0 and 1. A score of 0 corresponds to no similarity between the two user groups compared and a similarity of 1 corresponds to exactly similar user groups (or the same user group).

Figure 26:
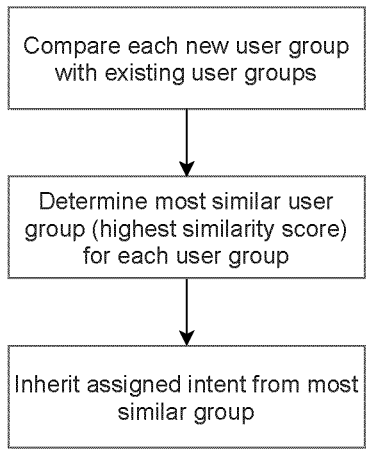
FIG. 26 is a flowchart showing an embodiment of similarity determination.

In an embodiment, b) a new user group deemed sufficiently similar to an existing user group will inherit the intent of the existing group. The process of evaluating similarity of user groups with each existing user group is presented in FIG. 26. A similarity score is computed for each similar user group for all existing user groups. The score for each comparison ranges from 0 to 1 inclusive, and the most similar comparison between a similar user group with an existing user group is the one with the highest similarity score. The steps assume that the similarity score produced from the most similar user group passes a pre-defined threshold for acceptability. In the event that the most similar group does not produce a similarity score higher than the threshold, the new user group is required to be evaluated for the best intent to be assigned.

In an embodiment, a best prefabricated user interface component is determined or selected for an identified user intent. That is, the process on how the best variant for a component is determined.

In an embodiment, once a user is classified and assigned an intent, a predetermined user interface component is selected to serve the intent. Additionally, in another embodiment, the interface component that best serves the user intent need not by already predetermined, and an optimal interface component can be determined for a collection of user interface components.

The determination of the most optimal user interface component is through one or a series of testing models where each user interface component presented to the user is evaluated and provided a score that represents the likelihood of success. Success is defined as a specific, favourable event that occurs during the user session but after the presentation of the user interface component. For example, a successful event is one where the user makes a purchase after being presented with an user interface component. In another example, a successful event is one where the user interacts with the user interface component after being presented with it.

The testing model can be in the form of 'A/B testing models' or 'Multi-armed Bandit testing models' or 'Reinforcement Learning models', all of which output measures to inform the probability of success for each item within a collection of competing items. In this scenario, the item is the user interface component and the collection of competing items consists of different interface components that serve a given intent.

The testing model involves allocating new users to be presented with different interface components and computing the likelihood of success based on the outcome of the session. Every time a user interface component is presented to a user for a given user intent, the testing model updates the score associated with the user interface component based on whether the successful event is achieved.

In an embodiment, the determination of the most optimal component for a given intent through the testing model is achieved when: a preset number of users is presented with any one of the components; and/or, the score for likelihood of success for a given component is above a threshold. In the first scenario, once a test for a user intent reaches a preset number of users that have been presented with interface components, scores are computed for each component with respect to the user intent. The component that has the highest score is chosen as the most optimal component for the given intent. In the second scenario, if the score for a given component reaches a certain threshold prior to the testing model having evaluated the preset limit of number of users, the component that first achieves this threshold is chosen as the most optimal component.

Figure 27:
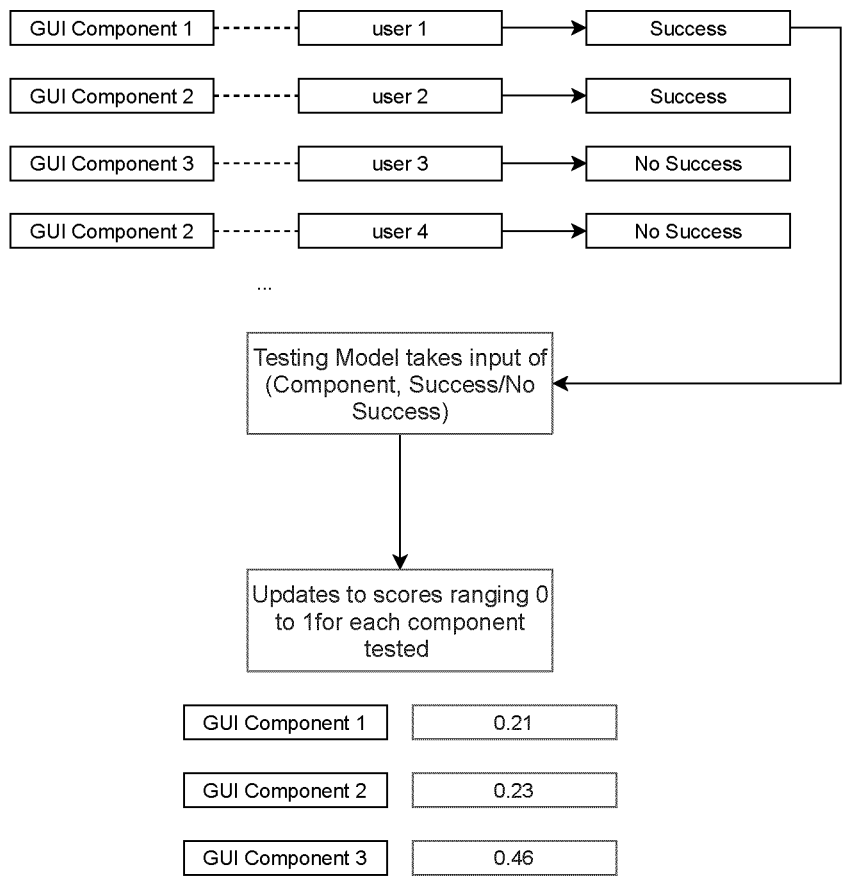
FIG. 27 is a representative drawing depicting an embodiment of the determination or selection of the best component.

Referring to FIG. 27, the general steps detailing an embodiment of the determination or selection of the best component is listed below:

Each time an interface component is presented to an user, an outcome is determined depending on if success is achieved or not.

The component and outcome associated with it are provided as inputs to the testing model.

Each time an input is provided to the testing model, the scores representing the likelihood of success for each component is updated to reflect the most recent input.

Upon termination of the test (whether a score threshold is met or when a preset number of users are presented with the test), a component is chosen as the most optimal one that serves the given intent.

In various embodiments, there are two types of machine learning systems used. The grouping machine learning model is an unsupervised machine learning system where there is no ground truth on the training data. The input for this system is training data in the form of user usage data and the output is distinct groups of users where the number of groups is predetermined. The grouping machine learning model uses clustering algorithms where the relationship between each user is evaluated against every other user in order to determine which user belongs to which group. The second type of machine learning model used is the supervised machine learning system for the intent prediction model. The input of this system is training data in the form of user usage data along with user ground truth. The output is a model capable of predicting which group a new user belongs to, based on the user usage data. The intent prediction machine learning model uses classification algorithms to create rules between the user usage data and ground truth.

In another aspect, the described methods may be distributed as a non-transitory computer readable medium.

Having thus described several aspects of at least one embodiment, it is to be appreciated that various alterations, modifications, and improvements will readily occur to those skilled in the art. Such alterations, modifications, and improvements are intended to be within the scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method comprising:
  collecting usage data from a computing device and a graphical user interface, the usage data generated by users of the computing device and the graphical user interface;
  grouping, by using a grouping machine learning model, each of the users into similar user groups based on a data representation, the data representation representing the usage data of the users and the similar user groups;
  determining a similarity score between the similar user groups and existing user groups, the existing user groups previously grouped and assigned an existing user intent using the grouping machine learning model based on a past data representation, the past data representation representing past usage data generated by existing users of a past computing device and a past graphical user interface;

if the similarity score exceeds a threshold, then, assigning to the similar user group a user intent that is the existing user intent, the data representation further representing the user intent of each of the similar user groups;

training an intent prediction model using a predictive machine learning model for predicting the user intent of an unclassified user based on unclassified user usage data, the training performed on the usage data;

providing access to the intent prediction model;

assigning an assigned user intent to the unclassified user using the intent prediction model and unclassified user usage data, the unclassified user usage data from an unclassified user computing device and the graphical user interface, and the unclassified user is now a classified user; and modifying the graphical user interface in response to the assigned user intent in order to facilitate the assigned user intent of the classified user.

2. The method of claim 1, further comprising:

if the similarity score does not exceed the threshold, then, assigning, by using the assigning machine learning model and the data representation, a user intent to each of the similar user groups, the data representation further representing the intent of each of the similar user groups.

3. The method of claim 2, wherein, determining a similarity between the similar user groups and existing user groups, further comprises:

processing the data representation with a standardizer function; and processing the past data representation with the standardizer function;

wherein, the standardizer function allows for the comparison of the data representation with the past data representation.

4. The method of claim 3, wherein, determining a similarity between the similar user groups and existing user groups, further comprises:

comparing each similar user group with each existing user group;

determining a similarity score for each comparison; and selecting the comparison of each of the similar user group with each existing user group with the highest similarity score;

wherein, the highest similarity score represents the most similar groups.

5. The method of claim 4, wherein, the past graphical user interface is the same as the graphical user interface or different then the graphical user interface.

6. The method of claim 1, further comprising:

periodically, processing new usage data of the classified user with the intent prediction model for determining a new user intent; and assigning the new user intent to the classified user.

7. The method of claim 6, wherein, the machine learning model is a series of machine learning models.

8. The method of claim 7, wherein, the modifying of the graphical user interface is done by changing a control component, a content component, or both.

9. The method of claim 8, wherein, the control components are any one of a button, a slider, a menu bar, or an order of items in a control component.

10. The method of claim 8, wherein, the content components are any one of a graphic, a text box, a list, a notification, an image, a label, a layout change, or, an order of items in a content component.

11. The method of claim 8, wherein, the user data is any one of: a referring source site, a device type, a session identifier, a user identifier, a user operating system, a browser operating system, a length of time spent during a session, a time of the session, a date of the session, a number of pages viewed, a specific page path, a new user, a returning user, and a purchase made.

12. The method of claim 11, wherein, the user intent is from a list of predetermined user intents.

13. The method of claim 12, further comprising, selecting a prefabricated user interface component for the identified user intention without the user selecting the identified user intention.

14. The method of claim 13, further comprising, selecting a preferred prefabricated user interface component corresponding to the identified user intention.

15. A system comprising:

a memory;

a processor, operatively connected to the memory, the processor configured to:

collect usage data from a computing device and a graphical user interface, the usage data generated by users of the computing device and the graphical user interface;

group, by using a grouping machine learning model, each of the users into similar user groups based on a data representation, the data representation representing the usage data of the users and the similar user groups;

determine a similarity score between the similar user groups and existing user groups, the existing user groups previously grouped and assigned an existing user intent using the grouping machine learning model based on a past data representation, the past data representation representing past usage data generated by existing users of a past computing device and a past graphical user interface;

if the similarity score exceeds a threshold, then, assign to the similar user group a user intent that is the existing user intent, the data representation further representing the user intent of each of the similar user groups;

train an intent prediction model using a predictive machine learning model for predicting the user intent of an unclassified user based on unclassified user usage data, the training performed on the usage data;

provide access to the intent prediction model;

assign an assigned user intent to the unclassified user using the intent prediction model and unclassified user usage data, the unclassified user usage data from an unclassified user computing device and the graphical user interface, and the unclassified user is now a classified user; and modify the graphical user interface in response to the assigned user intent in order to facilitate the assigned user intent of the classified user.

16. The system of claim 15, further configured to: if the similarity score does not exceed the threshold, then, assign, by using the assigning machine learning model and the data representation, a user intent to each of the similar user groups, the data representation further representing the intent of each of the similar user groups.

* * * * *